United States Patent
Nakata

[19]

[11] Patent Number: 5,927,871
[45] Date of Patent: *Jul. 27, 1999

[54] PRINTER HAVING SCROLL PRINT BUFFER AND PRINTING METHOD

[75] Inventor: Kazuhiro Nakata, Inagi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/495,230

[22] Filed: Jun. 27, 1995

[30] Foreign Application Priority Data

Jul. 1, 1994 [JP] Japan ..................... 6-150875
Jun. 13, 1995 [JP] Japan ..................... 7-146248

[51] Int. Cl.⁶ ..................................................... B41J 5/30
[52] U.S. Cl. .................................. 400/61; 400/76
[58] Field of Search ........................ 400/61, 76, 174, 400/175; 395/114

[56] References Cited

U.S. PATENT DOCUMENTS

| | | | |
|---|---|---|---|
| 4,313,124 | 1/1982 | Hara ......................... | 346/140 R |
| 4,345,262 | 8/1982 | Shirato et al. .............. | 346/140 R |
| 4,459,600 | 7/1984 | Sato et al. ................. | 346/140 R |
| 4,463,359 | 7/1984 | Ayata et al. ................ | 346/1.1 |
| 4,467,348 | 8/1984 | Fujii et al. ................ | 358/78 |
| 4,558,333 | 12/1985 | Sugitani et al. ............ | 346/140 R |
| 4,608,577 | 8/1986 | Hori ......................... | 346/1.1 |
| 4,674,895 | 6/1987 | Tanaka et al. .............. | 400/121 |
| 4,723,129 | 2/1988 | Endo et al. ................. | 346/1.1 |
| 4,740,796 | 4/1988 | Endo et al. ................. | 346/1.1 |
| 5,102,244 | 4/1992 | Takeda ...................... | 400/124.07 |
| 5,191,430 | 3/1993 | Sudoh et al. ................ | 395/115 |
| 5,530,792 | 6/1996 | Ikeda et al. ................ | 395/115 |

FOREIGN PATENT DOCUMENTS

| | | |
|---|---|---|
| 0310217 | 4/1989 | European Pat. Off. . |
| 0422926 | 4/1991 | European Pat. Off. . |
| 0574199 | 12/1993 | European Pat. Off. . |
| 0581515 | 2/1994 | European Pat. Off. . |
| 4137300 | 5/1992 | Germany . |
| 54-56847 | 5/1979 | Japan ..................... 346/1.1 |
| 58-195358 | 11/1983 | Japan . |
| 58-195359 | 11/1983 | Japan . |
| 59-123670 | 7/1984 | Japan ..................... 346/1.1 |
| 59-138461 | 8/1984 | Japan ..................... 346/1.1 |
| 60-71260 | 4/1985 | Japan ..................... 346/1.1 |
| 2-81639 | 3/1990 | Japan . |

*Primary Examiner*—Edgar Burr
*Assistant Examiner*—Charles H. Nolan, Jr.
*Attorney, Agent, or Firm*—Fitzpatrick, Cella Harper & Scinto

[57] ABSTRACT

A printer for printing by a print head having a plurality of recording elements arranged, includes a scan unit for scanning the print head in a different direction from the direction of arrangement of the recording elements, a memory for storing print data, a write unit for writing the print data into the memory, and a read unit for reading the print data written in the memory in synchronism with the scan of the print head by the scan means for supplying the print data to the print head. The memory has continuous addresses relative to the arrangement of the print data corresponding to the direction of arrangement of the recording elements.

37 Claims, 28 Drawing Sheets

64 DOTS
(8 BYTES)

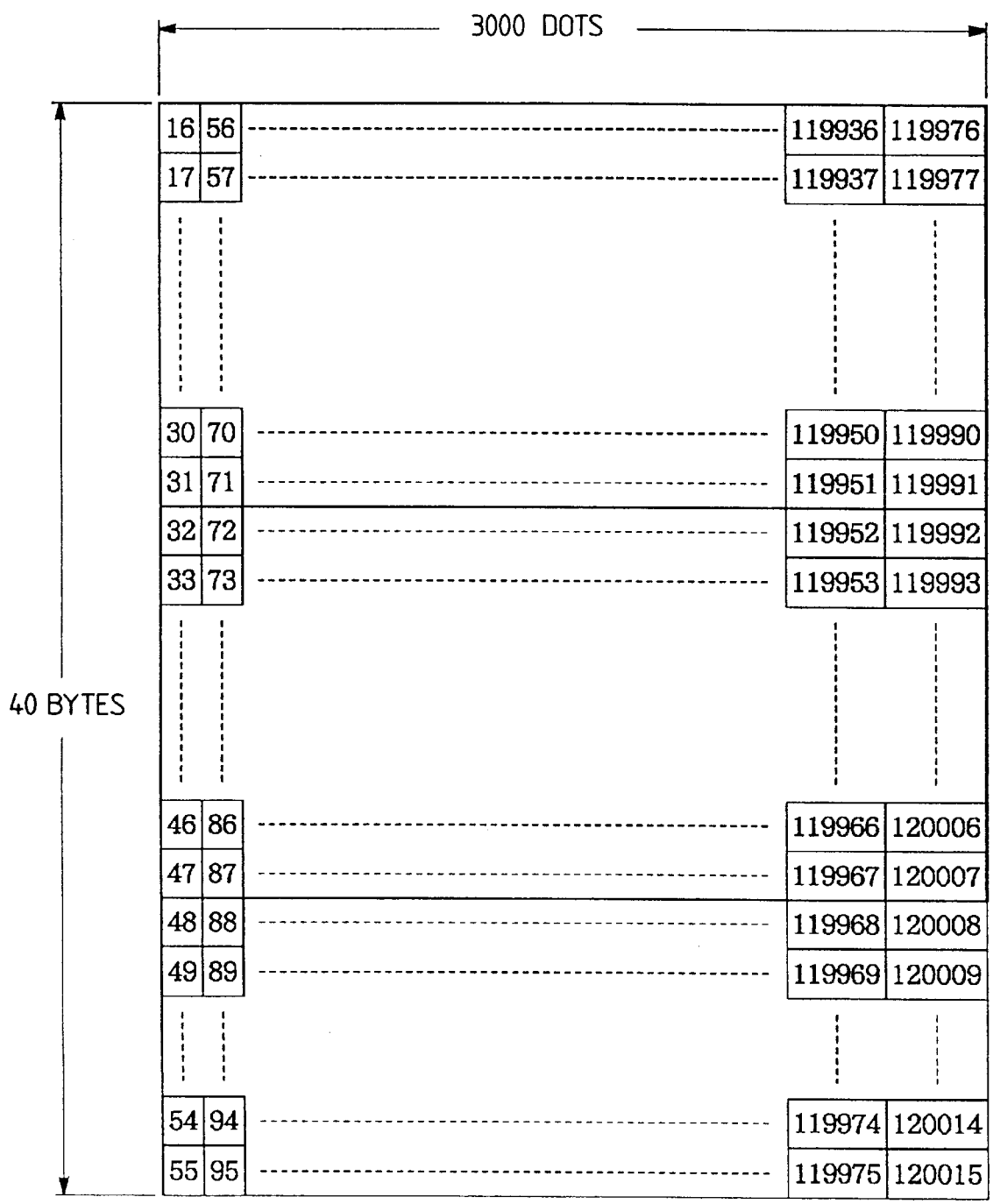

3.58°

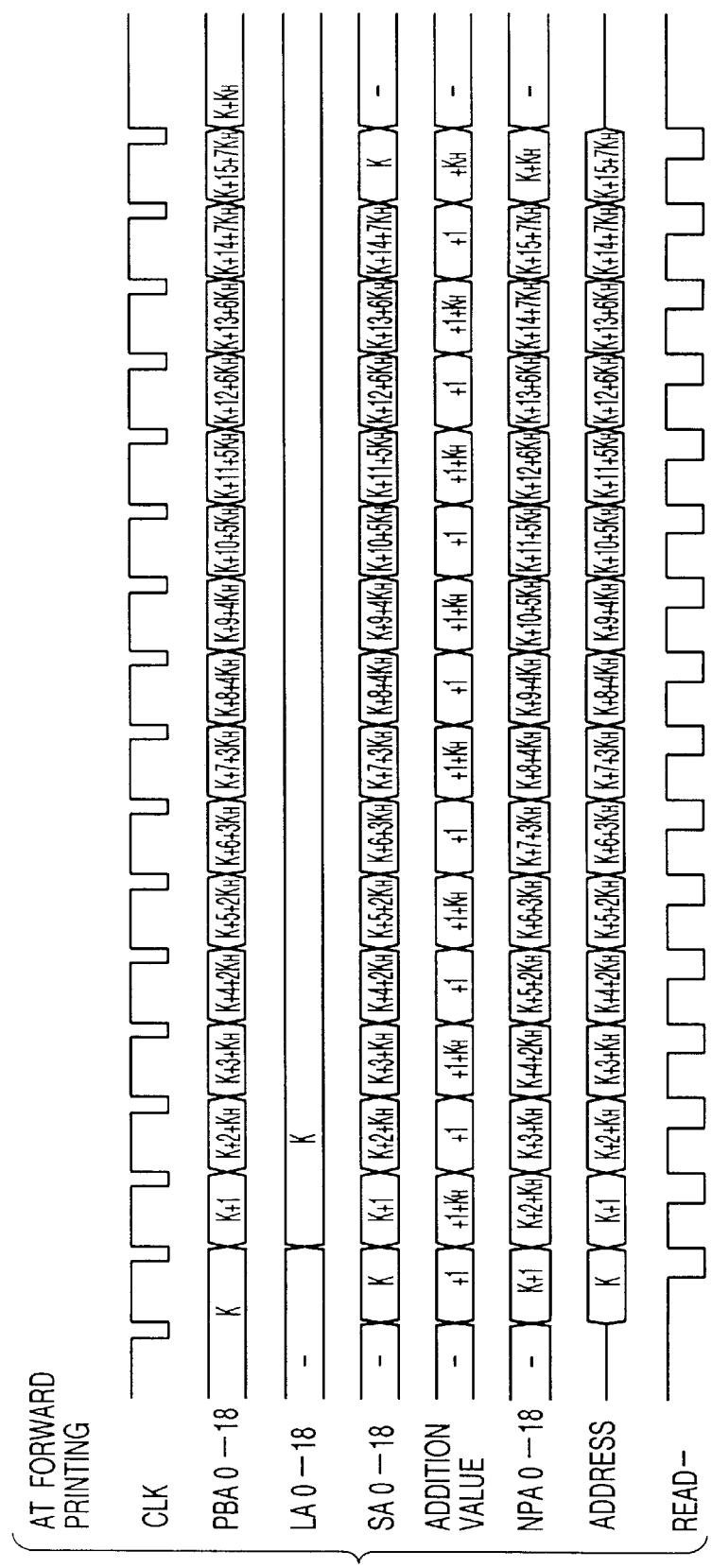

FIG. 15B

| AT BACKWARD PRINTING | | | | | | | | | | | | | | | | | | | |
|---|---|---|---|---|---|---|---|---|---|---|---|---|---|---|---|---|---|---|---|
| PBA 0–18 | — | K | K+1 | K+2+K$_H$ | K+3+K$_H$ | K+4+2K$_H$ | K+5+2K$_H$ | K+6+3K$_H$ | K+7+3K$_H$ | K+8+4K$_H$ | K+9+4K$_H$ | K+10+5K$_H$ | K+11+5K$_H$ | K+12+6K$_H$ | K+13+6K$_H$ | K+14+7K$_H$ | K+15+7K$_H$ | K-K$_H$ |
| ADDITION VALUE | — | — | +1 | | | | | | | | | | | | | | | −K$_H$ | — |
| NPA 0–18 | — | K+1 | K+2+K$_H$ | K+3+K$_H$ | K+4+2K$_H$ | K+5+2K$_H$ | K+6+3K$_H$ | K+7+3K$_H$ | K+8+4K$_H$ | K+9+4K$_H$ | K+10+5K$_H$ | K+11+5K$_H$ | K+12+6K$_H$ | K+13+6K$_H$ | K+14+7K$_H$ | K+15+7K$_H$ | K-K$_H$ | — |

3.58°

FIG. 23A
FIG. 23B
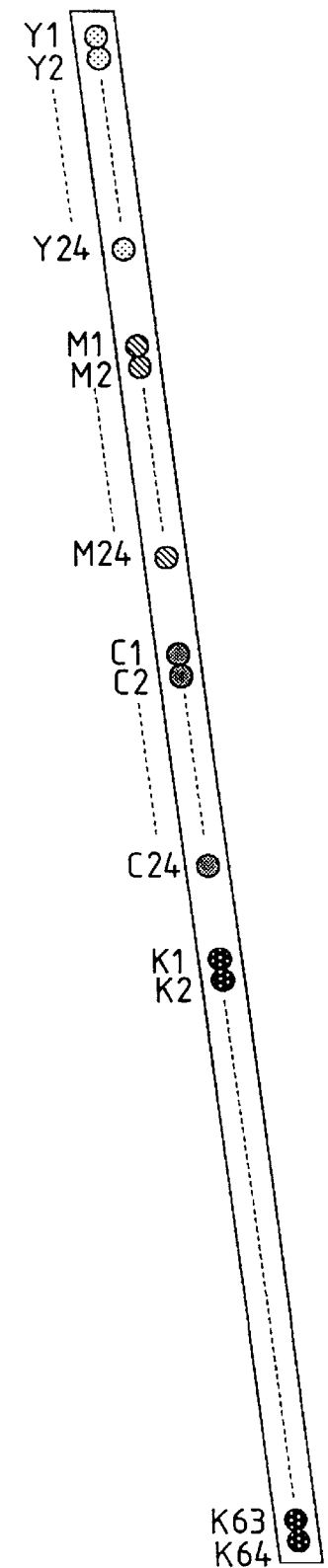
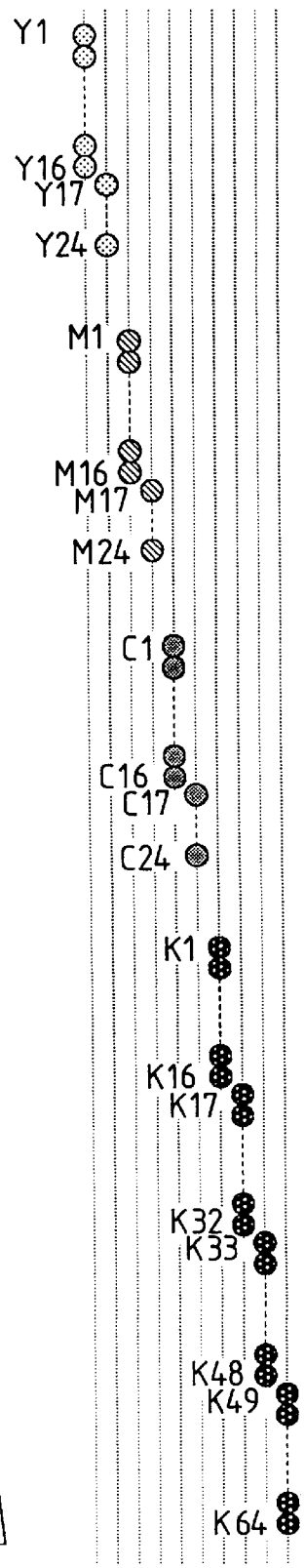

PRINTER HAVING SCROLL PRINT BUFFER AND PRINTING METHOD

BACKGROUND OF THE INVENTION

1. Field of the Invention

The present invention relates to a serial printer, and more particularly to a printer having a scroll print buffer and a printing method. Still more particularly, the present invention relates to a serial printer which uses a print head having a plurality of ink jet nozzles and permits printing two or more lines per scan of the print head or permits mounting of print heads of different nozzle structures with respect to a print color, and a printing method using such a printer.

2. Related Background Art

Serial printer have been widely used as compact and inexpensive printers. Particularly, ink jet printers have made great advancement as silent and high speed printers and improvement of various characteristics have been made. For example, as to print speed, an improvement of speed was attained by speeding up a scan velocity of a carriage which carries a head.

For low cost personal computers, because of provision of a color graphic environment, a low cost and high grade color printer has been desired. In this field, again, the ink jet printer has been attracting an interest as a preferable printer.

A prior art color printer is more expensive than a monochromatic printer because of the necessity of provision of three or four color print heads. Further, since the color printer optimizes the print grade and the processing time for the color printing, monochromatic printing by the color printer is inferior in print grade and print speed to that by the monochromatic printer.

A printer which exchanges the monochromatic print head and the color print head to print out a desired image with a high efficiency has been proposed. By using the monochromatic print head, a high image density is attained and the print speed is improved although color printing is not attained.

However, since the arrangement of the recording elements (nozzles) is different between the monochromatic print head and the color print head, a print buffer compatible to the both heads is desired.

On the other hand, in the serial printer, a technique to form one line (band) by a plurality of scans (hereinafter referred to as a fine mode) may be used to make banding less prominent. A sheet feed distance (sub-scan distance) therefor may be ½, ⅓ or ¼ of a head width. A print buffer which is compatible to the fine mode is desired.

However, in the serial printer, time is necessarily lost before and after a print period by a carriage scan due to the acceleration and deceleration of the carriage. As a result, improvement of print speed by increasing the scan speed of the carriage has reached its limit.

SUMMARY OF THE INVENTION

It is an object of the present invention to provide a printer having a print buffer applicable independently of a structure of recording elements of a print head and a printing method thereby.

It is another object of the present invention to provide a printer capable of reading print data from any location in a print buffer and a printing method thereby.

It is still another object of the present invention to provide a printer which permits an improvement of print speed and a printing method thereby.

It is still another object of the present invention to provide a printer which is compatible to monochromatic printing and color printing and a printing method thereby.

In order to achieve the above objects, in accordance with one aspect of the present invention, there is provided a printer for printing by a print head having a plurality of recording elements arranged, comprising:

scan means for scanning said print head in a different direction from the direction of arrangement of said recording elements;

a memory for storing print data;

write means for writing the print data into said memory; and read means for reading the print data written in said memory in synchronism with the scan of said print head by said scan means for supplying the print data to said print head;

said memory having continuous addresses relative to the arrangement of the print data corresponding to the direction of arrangement of said recording elements.

In accordance with another aspect of the present invention, there is provided a printer for printing by a print head having a plurality of recording elements arranged, comprising:

scan means for scanning said print head in a different direction from the direction of arrangement of said recording elements;

a memory for storing print data in a plurality of areas;

write means for writing the print data into a plurality of areas of said memory; and read means for reading the print data written in the areas of said memory in synchronism with the scan of said print head by said scan means for supplying the print data to said print head;

each of the areas of said memory having continuous addresses relative to the arrangement of the print data corresponding to the direction of arrangement of said recording elements.

In accordance with other aspect of the present invention, there is provided a printing method for printing by a print head having a plurality of recording elements arranged, comprising the steps of:

providing scan means for scanning said print head in a different direction from a direction of array of said recording elements;

providing a memory for storing the print data;

writing the print data in a vacant area of said memory; and reading the print data written into said memory in synchronism with the scan of said print head by said scan means for supplying the print data to said print head;

said memory having continuous addresses relative to the array of the print data corresponding to the direction of array of said recording elements.

In accordance with the above arrangement, when a print head having a large number of dots to allow printing of two or more lines at a time is to be used, data is shifted by a bit shift function when the data is transferred from an edit buffer to a print buffer to allow setting of any carriage return pitch and to be compatible to superposition of the edit buffer.

More specifically, the present invention improves the print speed by using the print head capable of simultaneous printing of two lines. Further, it provides an inexpensive color printer by using a four-color built-in color head and increase the number of black nozzles relative to the number of nozzles of other colors to prevent the reduction of the print speed at the monochromatic printing. Further, the monochromatic head and the color head are accommodated in pluggable cartridges so that one printer may be compatible to the high speed monochromatic printing and the color printing.

BRIEF DESCRIPTION OF THE DRAWINGS

FIG. 9 shows a configuration of the print buffer after one band of printing,

FIGS. 15A and 15B show a timing chart of an operation of the address generation circuit, FIGS. 23A and 23B show a relation between an arrangement of the nozzles of the color head and an arrangement of the print dots.

DETAILED DESCRIPTION OF THE PREFERRED EMBODIMENTS

The present invention is now explained in detail in conjunction with the accompanying drawings.

[Embodiment 1]

Figure 1:
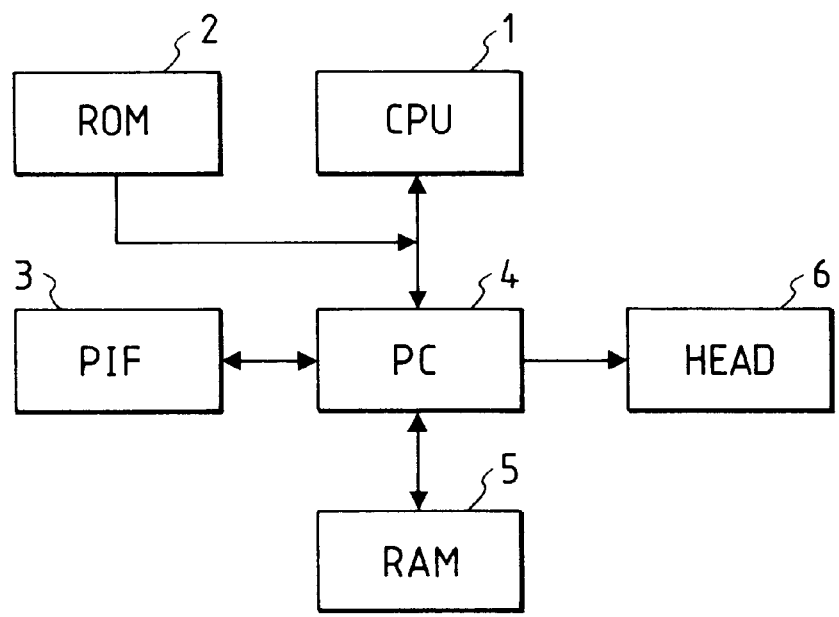
FIG. 1 shows a block diagram of a configuration of major circuits of a printer.

FIG. 1 shows a block diagram of major parts of a printer control circuit in accordance with the present invention. In FIG. 1, numeral 1 denotes a CPU, numeral 2 denotes a ROM, numeral 3 denotes a parallel interface, numeral 4 denotes a printer control IC, numeral 5 denotes a RAM and numeral 6 denotes a print head.

The CPU 1 controls the overall printer, and comprises a processor for executing a program as well as a timer function and input/output ports. The program executed by the CPU 1 includes a controller program for decoding data and commands transferred from a host system to generate image data to be printed, and an engine program for controlling a printer mechanism such as a print head to record on a print sheet. The ROM 2 stores the program to be executed by the CPU 1 and font data.

The parallel interface 3 is connected to the host system such as a computer and receives the print data and commands. The printer control IC 4 controls the parallel interface 3, the RAM 5 and the print head 6 in accordance with the command from the CPU 1. The RAM 5 is a dynamic RAM having a 16-bit bus width and is used to store the received data and the image data.

The print head 6 is an ink jet head having 128 ink jet nozzles arranged longitudinally at a $\frac{1}{360}$-inch pitch and it discharges ink droplets while it is horizontally scanned to record on a print sheet.

In FIG. 1, the data received by the parallel interface 3 is temporarily stored in a receive register in the printer control IC 4 and then stored in a receive buffer area defined in the RAM 5. When the data in the receive register of the printer control IC is transferred to the receive buffer, the reception of the next data is ready. The data is received byte by byte.

Since the data is written into the receive buffer while the CPU 1 reads the ROM 2, the transfer of the received data is conducted without sacrificing the processing speed of the CPU 1. Since the CPU 1 frequently reads the ROM 2 to execute the program, the data received by the parallel interface 3 is immediately stored in the receive buffer. Thus, high speed data reception is attained. Since a portion of the RAM 5 is used as the receive buffer, no cost increase occurs from providing the receive buffer.

The controller program executed by the CPU 1 checks whether the data is stored in the receive buffer, and if it is stored, it analyzes the received data. If the received data is a character code, it reads bit image data of the received character code from the font data area of the ROM 2 and develops it into the edit buffer area defined in the RAM 5. When the controller program prepares the edit buffer comprising one line of bit image data, it delivers it to the engine program. The engine program transfers the data of the edit buffer to the print buffer defined in the RAM 5 to print out in accordance with the data of the print buffer.

Figure 27:
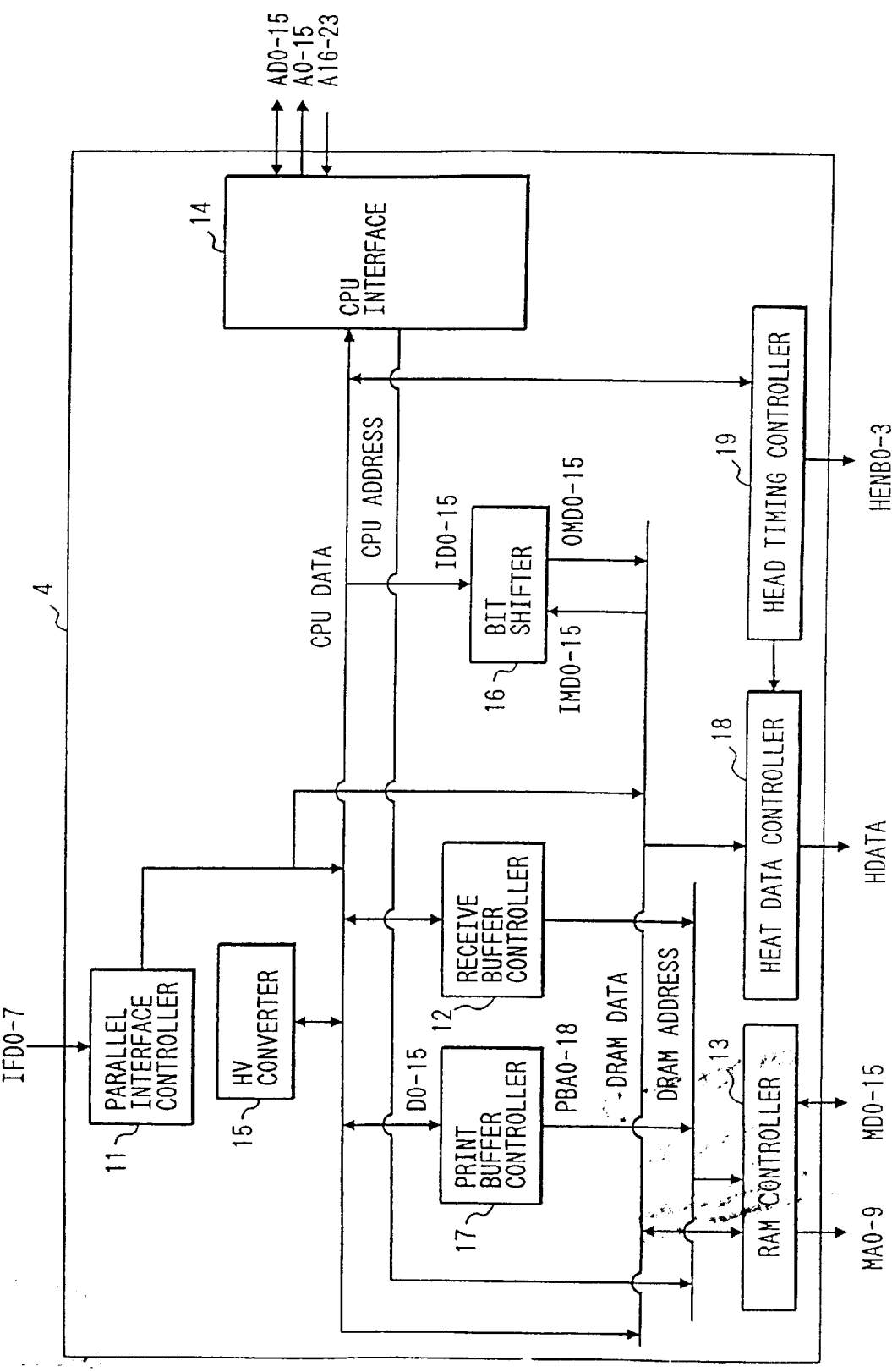
FIG. 27 shows a block diagram of a circuit configuration of a printer control IC.

Referring to FIG. 27, details of the printer control IC 4 are explained. A parallel interface controller 11 controls the parallel interface 3 to receive the data and stores the received data in the receive buffer. A receive buffer controller 12 transfers the received data stored in the receive register to the receive buffer in the RAM 5. The transfer of the data to the RAM 5 is conducted in accordance with the control of a RAM controller 13.

The access to the RAM 5 by the CPU 1 is conducted through a CPU interface 14. The data developed into the edit buffer by the CPU 1 is H-V converted by an H-V converter 15 and transferred to the print buffer. When the data of the edit buffer is edited before it is transferred to the print buffer, a bit shift circuit 16, to be described later, is used.

When one scan (one line) of data is ready in the print buffer, a print buffer controller 17 to be described later reads the data from the print buffer and supplies it to the head 6 through a head data controller 18. Various timings to the head 6 are generated by a head timing controller 19.

Figure 2:
FIG. 2 shows a configuration of an edit buffer.

FIG. 2 shows a configuration of the edit buffer. A height of the edit buffer is 64-dot high, and the data in the buffer is arranged longitudinally. Thus, a longitudinal column comprises 8 bytes. The number of dots corresponding to a print width of the printer is set laterally. For example, when the print width corresponds to a size A4 sheet, the number of lateral dots is approximately 2900 dots.

Figure 3:
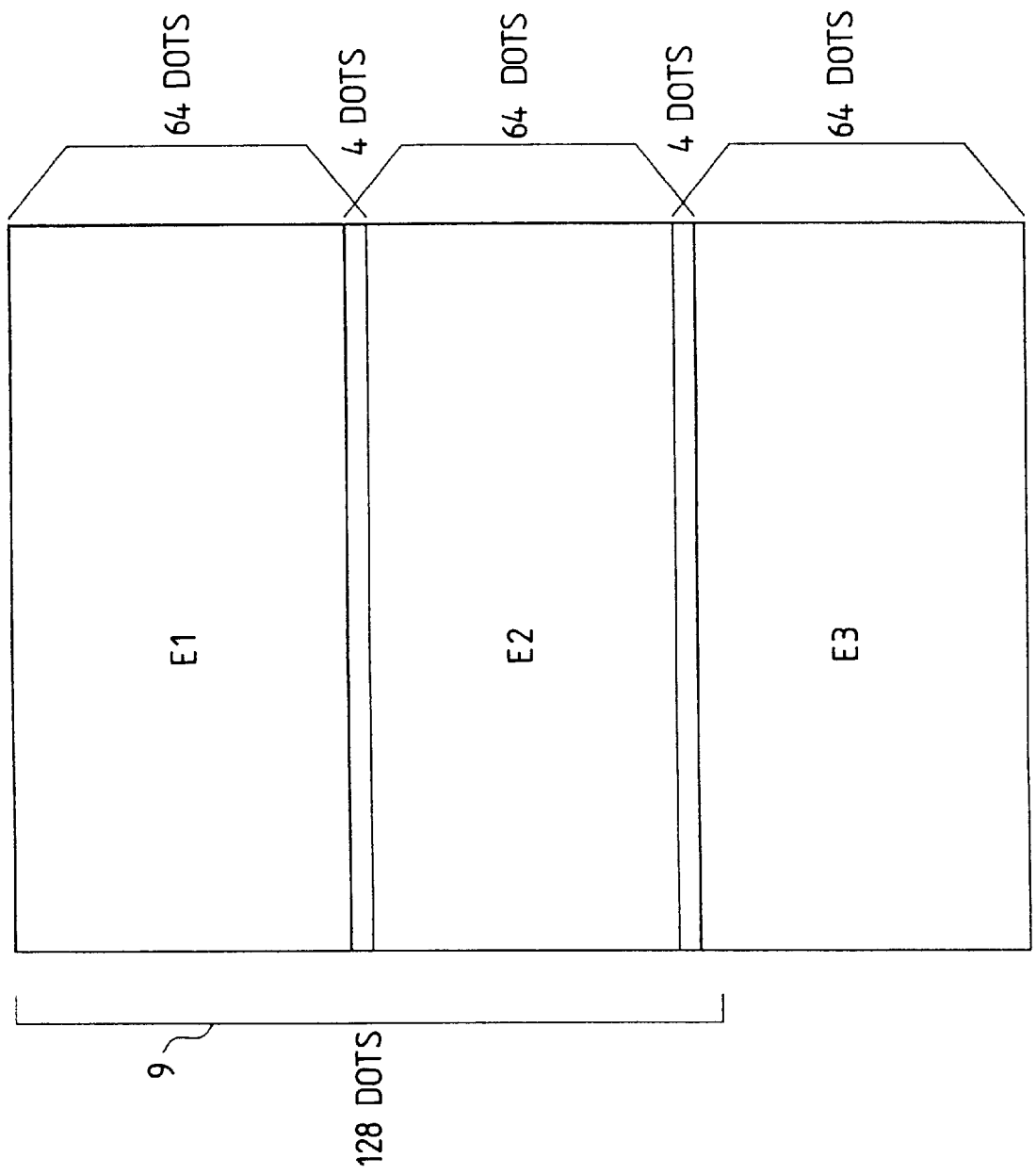
FIG. 3 shows a relation between the edit buffer and a print area.

FIG. 3 shows a relation between the edit buffer and the print area. In FIG. 3, E1, E2, and E3 denote edit buffers and numeral 9 denotes a height of the print area which can be printed by one scan of the print head 6. Since the normal height of the edit buffer is 64 dots while that of the print head is 128 dots, the print head can print two or more lines of the edit buffer in one scan. However, since a carriage return pitch of a conventional host computer is not 64 dots, it is not possible to make the 128-dot print data by simply longitudinally arranging two 64-dot height edit buffers. For example, in FIG. 3, since the carriage return pitch is 60 dots, 4-dot overlap occurs between edit buffers.

Accordingly, it is necessary to shift the second line edit buffer by 4 bits when it is printed. In the overlap area of the edit buffers, it is necessary to print the logical OR function of the two edit buffers. Since the conventional host computer allows any setting of the carriage return pitch, the overlap of the edit buffers should also be set to any value.

In the printer of the present embodiment, a bit shift circuit 16 for shifting the data of the edit buffer before it is written into the print buffer is built in the printer control IC 4.

Figure 4:
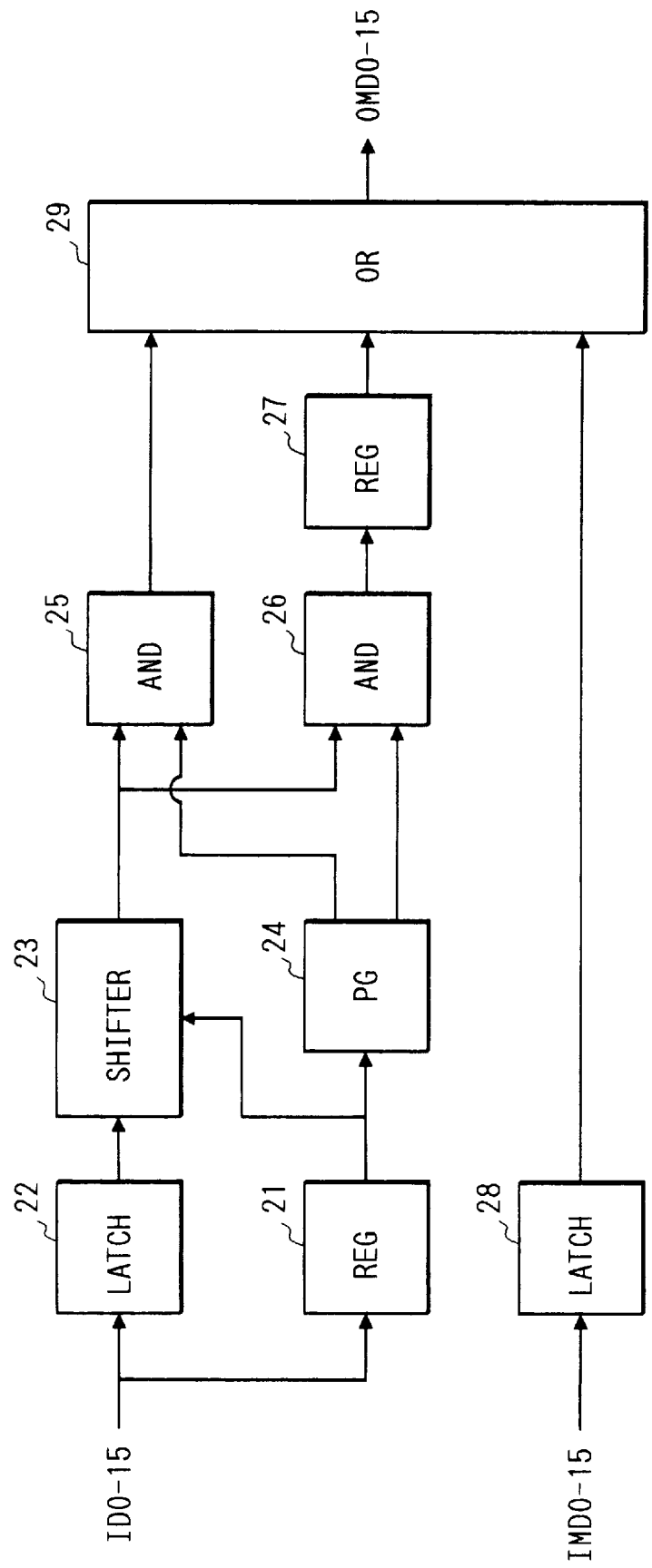
FIG. 4 shows a block diagram of a circuit configuration of a bit shift circuit.

FIG. 4 shows a circuit configuration of the bit shift circuit 16. In FIG. 4, ID0–15 denote input data from the data bus of the CPU 1, IMD0–15 denotes input data from the data bus of the RAM 5, and OMD0–15 denote output data to the data bus of the RAM 5. Numeral 21 denotes a register for setting a shift amount, numeral 22 denotes a latch for temporarily saving the data written from the CPU 1 through the data bus, numeral 23 denotes a shifter for shifting the written data, numeral 24b denotes a pattern generator for generating a mask pattern to be applied to the shift data, numerals 25 and 26 denote AND circuits for masking the shift data, numeral 27 denotes a register for saving the shifted-out data, numeral 28 denotes a latch for temporarily saving the data read from the RAM 5 and numeral 29 denotes an OR circuit for logically ORing the shift data and the data read from the RAM 5.

Figure 5:
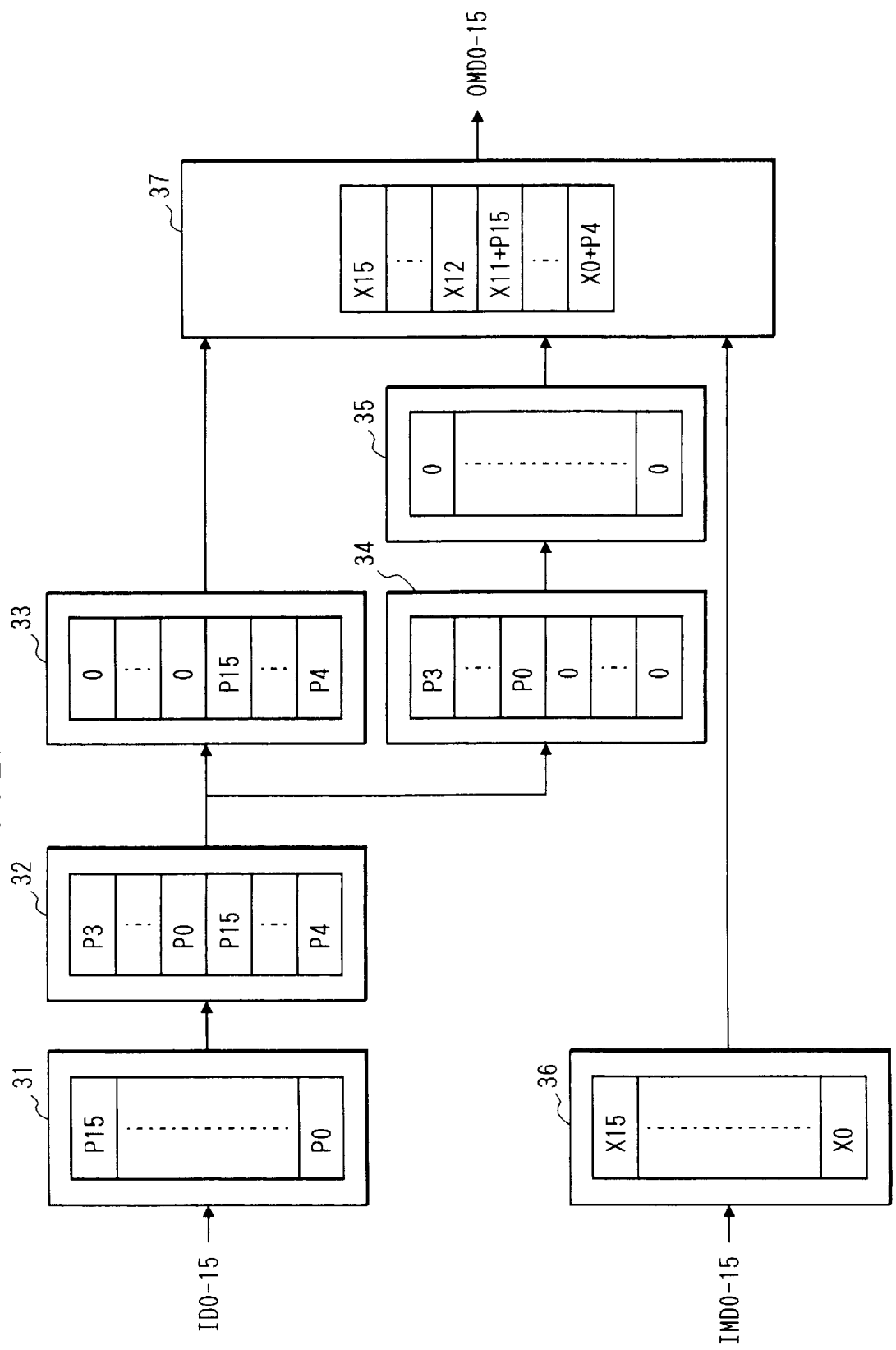
FIG. 5 shows first data conversion of the bit shift circuit.
Figure 6:
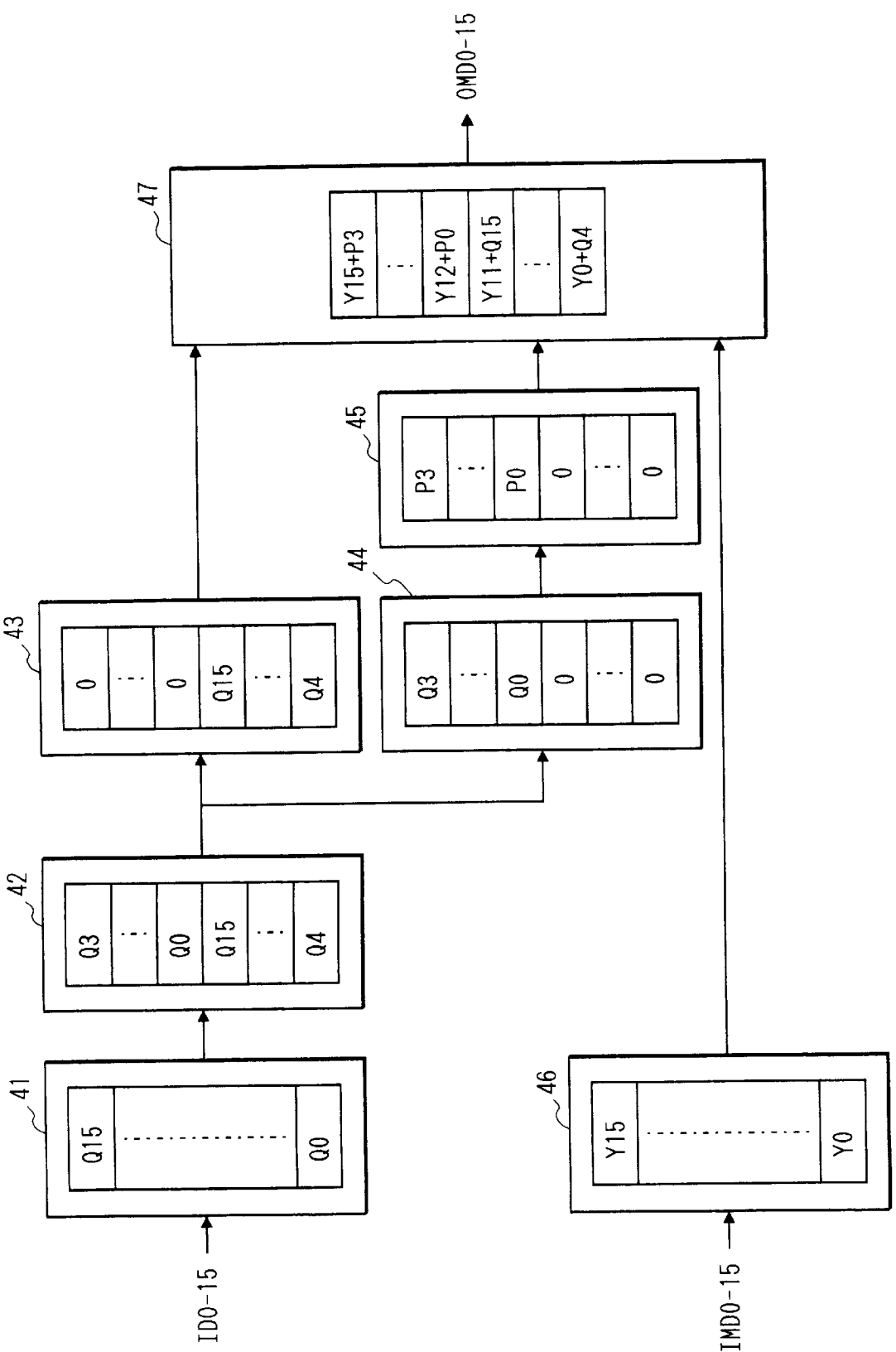
FIG. 6 shows second data conversion of the bit shift circuit.

FIG. 5 and 6 show data conversion conducted by the bit shift circuit when the data is transferred from the edit buffer to the print buffer. FIG. 5 shows the data converted at the first data transfer and FIG. 6 shows the data converted at the subsequent second data transfer.

In FIG. 5, numeral 31 denotes 16-bit data P written by the CPU 1 and saved by the latch 23, numeral 32 denotes data shifted by the shifter 23, numeral 33 denotes data masked by the AND circuit 25, numeral 34 denotes data masked by the AND circuit 26, numeral 35 denotes data saved by the register 27 and numeral 37 denotes data merged by the OR circuit 29. Numeral 36 denotes 16-bit data X written by the RAM 5 and saved by the latch 28.

FIG. 6 is similar to FIG. 5. Numeral 41 denotes 16-bit data Q written by the CPU 1 and saved by the latch 23, numeral 42 denotes data shifted by the shifter 23, numeral 43 denotes data masked by the AND circuit 25, numeral 44 denotes data masked by the AND circuit 26, numeral 45 denotes data saved by the register 27 and numeral 47 denotes data merged by the OR circuit 29. Numeral 46 denotes 16-bit data Y written by the RAM 5 and saved by the latch 28.

Referring to FIGS. 4 and 5, an operation of the bit shift circuit is explained. The CPU 1 sets a shift amount corresponding to the carriage return pitch to a shift amount register 21 and then transfers the data from the edit buffer to the print buffer. Since the data bus width of the CPU 1 is 16 bits, the data is transferred from the edit buffer to the print buffer 16 bits at a time. When the CPU 1 writes data in the print buffer area of the RAM 5, the written data 31 is inputted to the shifter 23 through the latch 22. The latch 22 saves the data 31 until the writing of the data is completed. The shifter 23 is a combination of selectors and outputs data of any shift amount set by the content of the shift amount register 21. Thus, the shifter 23 does not require a shift time as it is required in a circuit using a shift register.

In FIG. 5, since the shift amount is set to 4, the input data P15–P0 is shifted down by 4 bits and the shifted-out data P3–P0 is returned upward to form data 32. The AND circuit 25 makes the bits sent out by the shifter to '0' to output data 33. The AND circuit 26 mask the bits other than those sent out by the shifter to '707' to output data 34. Data 35 of all-zero is initially set in the register 27. The data outputted by the AND circuit 25 and the data 35 outputted by the register 27 are inputted to the OR circuit 29.

When the CPU 1 starts to write the data into the print buffer area of the RAM 5, the data 36 is read from an address of the print buffer to which the data is to be written, in parallel to the write operation and it is inputted to the OR circuit 29 through the latch 28. The latch 28 saves the data 36 until the writing of the data is completed. The OR circuit 29 outputs the data 37 which is the logical OR function of the data 35 and the data 36. The data 37 is written into the print buffer. The reading of the data 36 from the print buffer and the writing of the data 37 into the print buffer are conducted as a read modify write cycle to the RAM 5 and one read modify write cycle is executed per write cycle of the CPU 1. By the read modify write cycle, the data P15–P0 written by the CPU 1 is shifted and P15–P4 is written into the print buffer. In writing the data, the data is logically ORed with the data X15–X0 originally present in the print buffer. When the writing is completed, the data P3–P0 outputted by the AND circuit 26 is saved in the register 27.

Referring to FIG. 6, the next writing of the data into the print buffer is explained. The data conversion in FIG. 6 is identical to that of FIG. 5. The data Q15–Q0 written by the CPU 1 is shifted, and Q15–Q4 and P3–P0 which was shifted out and not written in the previous writing are written into the print buffer. In writing the data, the data is logically ORed with the data Y15–Y0 originally present in the print buffer. The above operation is repeated to transfer the data in the edit buffer to the print buffer while it is sequentially shifted.

Figure 7:
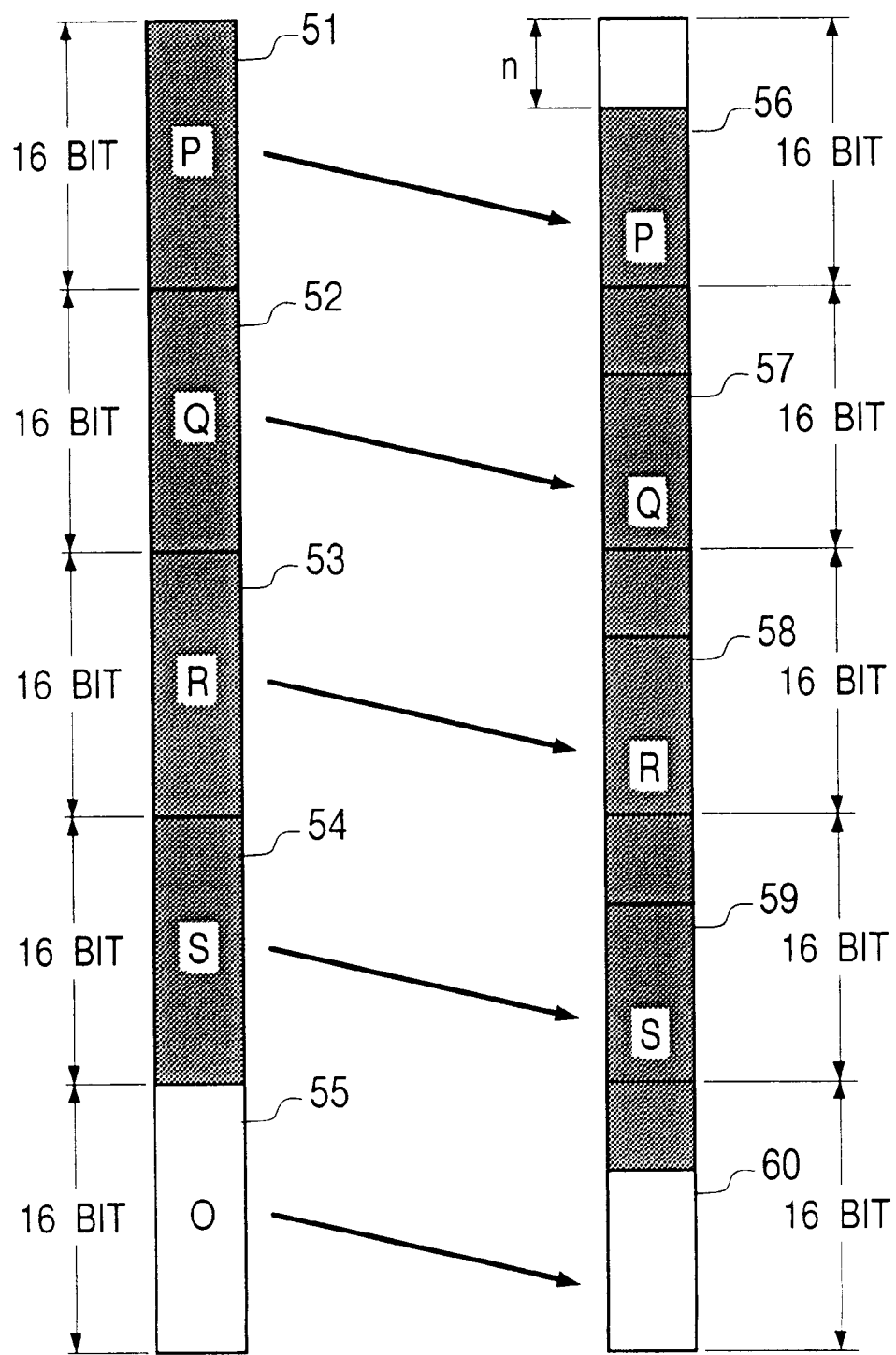
FIG. 7 shows a shift method of one vertical column of data of the edit buffer.

FIG. 7 shows a method for transferring one longitudinal column of data of the edit buffer to the print buffer. In FIG. 7, numerals 51, 52, 53 and 54 denote data in the edit buffer, numeral 55 denotes zero data, and numerals 56, 57, 58, 59, and 60 denote data in the print buffer.

The CPU 1 sets the shift amount n to the printer control IC 4 and writes the data 51 of the edit buffer into the print buffer 56. The bit shift circuit of the printer control IC 4 shifts the data 51 by n bits and writes it into the print buffer 56 to OR it with the original data of the print buffer 56. The CPU 1 sequentially writes the data 52, 53, and 54 of the edit buffer into the print buffers 57, 58, and 59 and finally write the zero data 55 into the print buffer 60 to transfer the remaining n bits of the data 54 to the print buffer. Thus, one longitudinal column of the edit buffer, that is, the 60-dot data is transferred to the print buffer. This operation is repeated by the number of horizontal dots so that one line of data of the edit buffer is transferred to the print buffer.

In this manner, the data in the edit buffer may be shifted by any amount by transferring the data of the edit buffer to the print buffer so that any carriage return pitch may be set. By logically ORing with the original data in the print buffer, the data in the overlap area of the edit buffers may be ORed and any number of edit buffers may be overlapped.

By the use of the dedicated bit shift circuit to shift the data, a shift time is not required, and by the use of the read modify write to overlap the data, a loss time by the shift and overlap of the data does not occur. Further, since the edit buffer and the print buffer are continuous in their longitudinal addresses, a high speed transfer method such as a block transfer command and a DMA function built in the CPU may be used in the data transfer.

Figure 8:
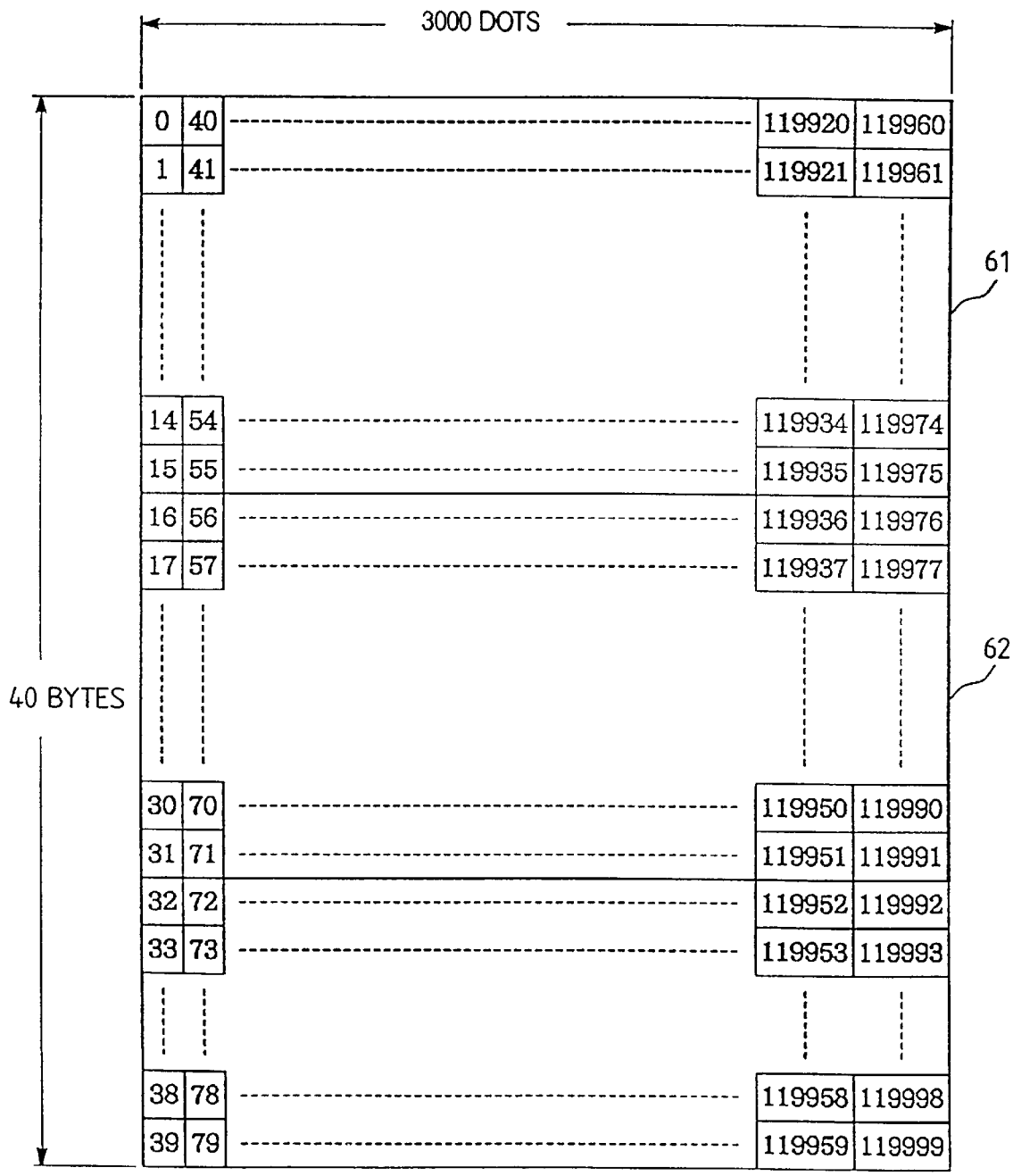
FIG. 8 shows a configuration of a print buffer.

Referring to FIG. 8, a configuration of the print buffer and an address arrangement thereof which are characteristic of the present embodiment are explained. In FIG. 8, each numbered frame denotes one byte of data and a numeral therein denotes an address. In the print buffer, the bit data is arranged longitudinally (along the array of nozzles) and the addresses are continuous longitudinally. The address starts from 0 which is conveniently assigned and in actual practice, may start with any value. A 40-byte height is secured for the print buffer. Since the print head has 128 nozzles, a height required for one scan is 16 bytes. Accordingly, it has a capacity of 2.5 scans. A feature in the present embodiment is that the longitudinal addresses of the capacity corresponding to multiple scans are continuous, for example, 0–39, 40–79, . . .

In FIG. 8, numeral 61 denotes a print area to be printed in the first head scan and numeral 62 denotes a print area to be printed in the second head scan. Since the area of more than two head scans is secured as the capacity of the print head, the print data of the area to be printed in the next head scan can be prepared during the head scan and a wait time of the printer operation for preparing the print data is prevented. In FIG. 8, the width of the print buffer is 3000 dots but in actual practice, it may be set to any value accordance with the width of the print sheet. In FIG. 8, the width is 40 bytes but it may be set to any value within the capacity secured as the print buffer in the RAM.

FIG. 9 shows a configuration of the print buffer after the first head scan and after the area 61 in FIG. 8 has been released. The print data to be printed in the third and subsequent head scans is written into the released area. More particularly, of the released area 61, the addresses 0–15 are not used and the addresses 120000–120015 are newly used. In this manner, by making the print buffer helically continuous, the addresses of the print buffer are always continuous longitudinally independent from the print area to be printed by the head as shown in FIGS. 8 and 9. It appears as if it is scrolled.

The continuity is maintained until one page of printing is completed. The configuration of the print buffer is determined by the print width and the buffer capacity and it is independent from the head structure. Thus, the configuration of the print buffer may be determined independently from the number of nozzles of the print head and a method for managing the print buffer is simplified when a plurality of print heads of different nozzle structures are used. Since the longitudinal addresses in the print buffer are continuous, any position in the print buffer may be set as the print area and the freedom in determining the print position is enhanced.

For example, in the present embodiment, the head having 128 nozzles is described. In this case, the area of the print buffer used in one scan of print is 16 bytes longitudinally (areas 61 and 62). When a head having 64 nozzles is used, one half of the area 61 is used for one scan of print, and when a head having 256 nozzles is used, the areas 61 and 62 are used for one scan of print. In this manner, the print buffer may be readily managed independently from the nozzle structure.

The management of the print buffer in the fine mode recording is now explained.

The fine mode recording means a recording method to record a high grade image by completing the recording of one band (the width of the recording head) complementarily by a plurality of scans by using different areas of the recording head in order to reduce the banding of the serial scan.

Figure 28A:
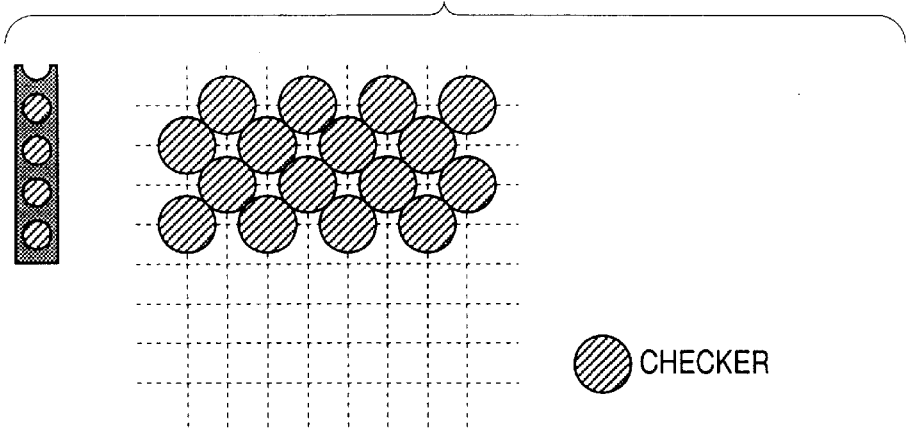
FIGS. 28A to 28C show an operation in the fine mode.
Figure 28B:
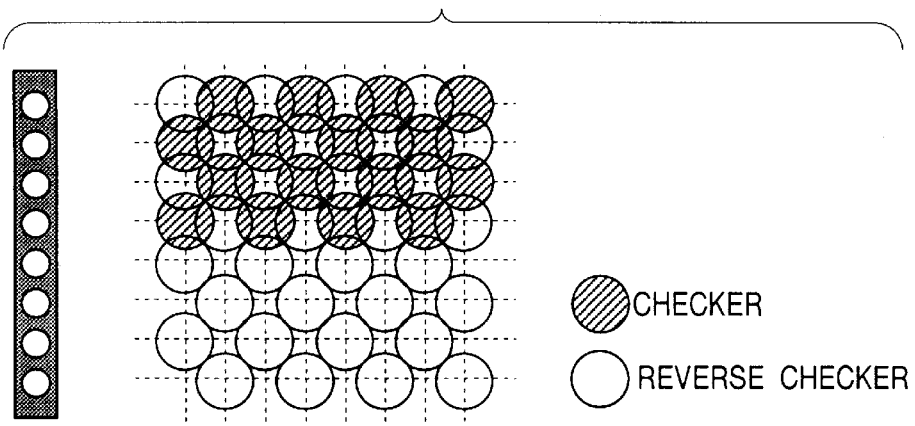
Figure 28C:
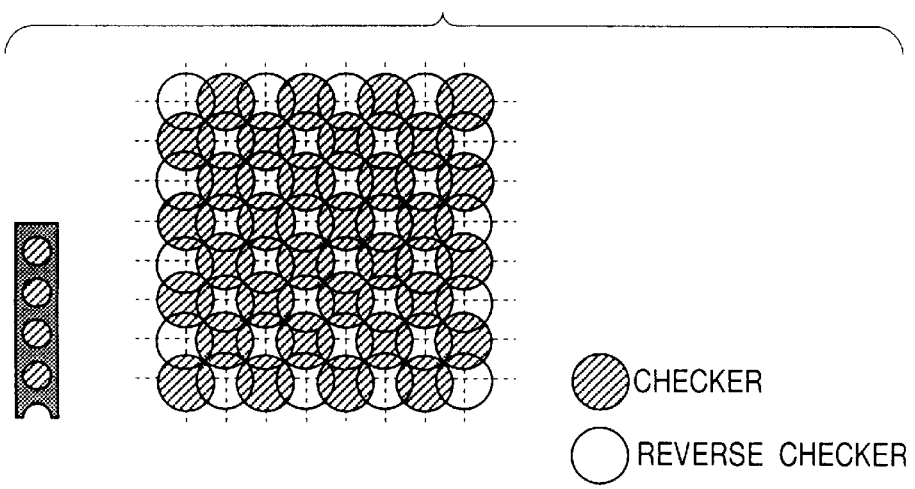

Referring to FIGS. 28A, 28B and 28C, a concept of the fine mode recording method is explained. To facilitate comprehension, it is assumed that the number of nozzles of the head is 8.

In the fine mode, the recording is made in a plurality of zig-zag passes as shown in FIGS. 28A, 28B, and 28C. For example, in a 2-pass system, a sheet feed amount is set to one half of the head width and the record data in one scan is reduced (or thinned) to one half (zig-zag or checkered pattern and complementary zig-zag or reverse checkered pattern) to complete the recording in two scans.

FIGS. 28A, 28B, and 28C illustrate how the recording in a predetermined area is completed when the zig-zag pattern and the complementary zig-zag pattern are used, for a multi-head having 8 nozzles. In the first scan, the zig-zag pattern (hatched dots) is recorded by using the lower four nozzles (see FIG. 28A). Then, in the second scan, the sheet is fed by 4 pixels (one half of the head length) and the complementary zig-zag pattern (white dots) is recorded (FIG. 28B). In the third scan, the sheet is again fed by 4 pixels (one half of the head length) and the zig-zag pattern is recorded again (FIG. 28C).

In this manner, the sheet feed by 4 pixels and the recording of the zig-zag pattern and the complementary zig-zag pattern are effected alternately to complete the record area of 4 pixels for each scan. Thus, by completing the recording by two different types of nozzles in the same area, a high grade image without density irregularity is attained.

In the monochrome cartridge, the 128 nozzles are divided into four so that 32 nozzles are used. In a color mode of a color cartridge to be described later, 24 nozzles for each of four colors are divided into three so that 32 nozzles are used. In a monochrome mode, the 64 black nozzles are divided into two so that 32 nozzles are used.

In this manner, in the fine mode recording, one line of data is read a plurality of times and it is read serially from different longitudinal positions (along the array of nozzles). By using the print buffer of the present embodiment having the longitudinally continuous addresses, the read position (address) may be set to any position and the management of the print buffer in the fine mode recording is facilitated.

Details of the transfer of the print data to the print buffer, the readout of the print data from the print buffer, and the release of the print buffer will be described hereinafter.

Figure 10A:
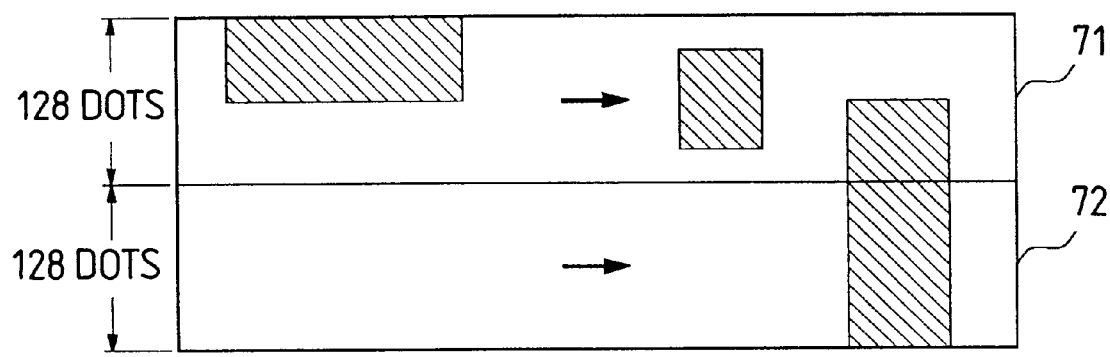
FIGS. 10A and 10B show a relation between the print data and a print direction.
Figure 10B:
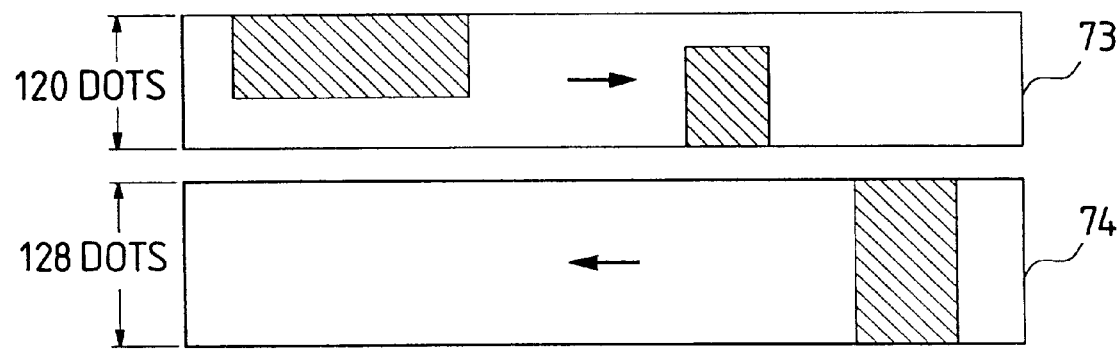

FIGS. 10A and 10B show a relation between the print data and the print direction. In FIGS. 10A and 10B, numerals 71, 72, 73, and 74 denotes print areas printed by the print head in one scan, a hatched area indicates an area in which the print data is actually present, and an arrow indicates the print direction. Normally, as shown in FIG. 10A, the head is returned while the sheet is fed after the area 71 has been printed and the area 71 is printed. On the other hand, FIG. 10B shows a blank raster near the bottom end in the print area, that is, the presence of a dot line not printed in the print area.

In FIG. 10B, the dot 120 and subsequent dots of the area 73 are blank raster. Thus, the printer prints only 120 dots from the top and then prints the area 74 while the print head is moved in reverse after the sheet feed. By using the reverse printing, the return time of the head is not required and the print time is shortened. In the reverse printing, the print shift may be larger than that of the single direction printing but no practical problem arises for the blank raster because the print shift is not prominent. In this printing method, the printing is not always made 128 dots at a time but the print position changes in accordance with the print data. In the print buffer configuration shown in FIGS. 8 and 9, the printing may be made from any position in the print buffer so that no extra load by the change of the print position is imposed.

Figure 11:
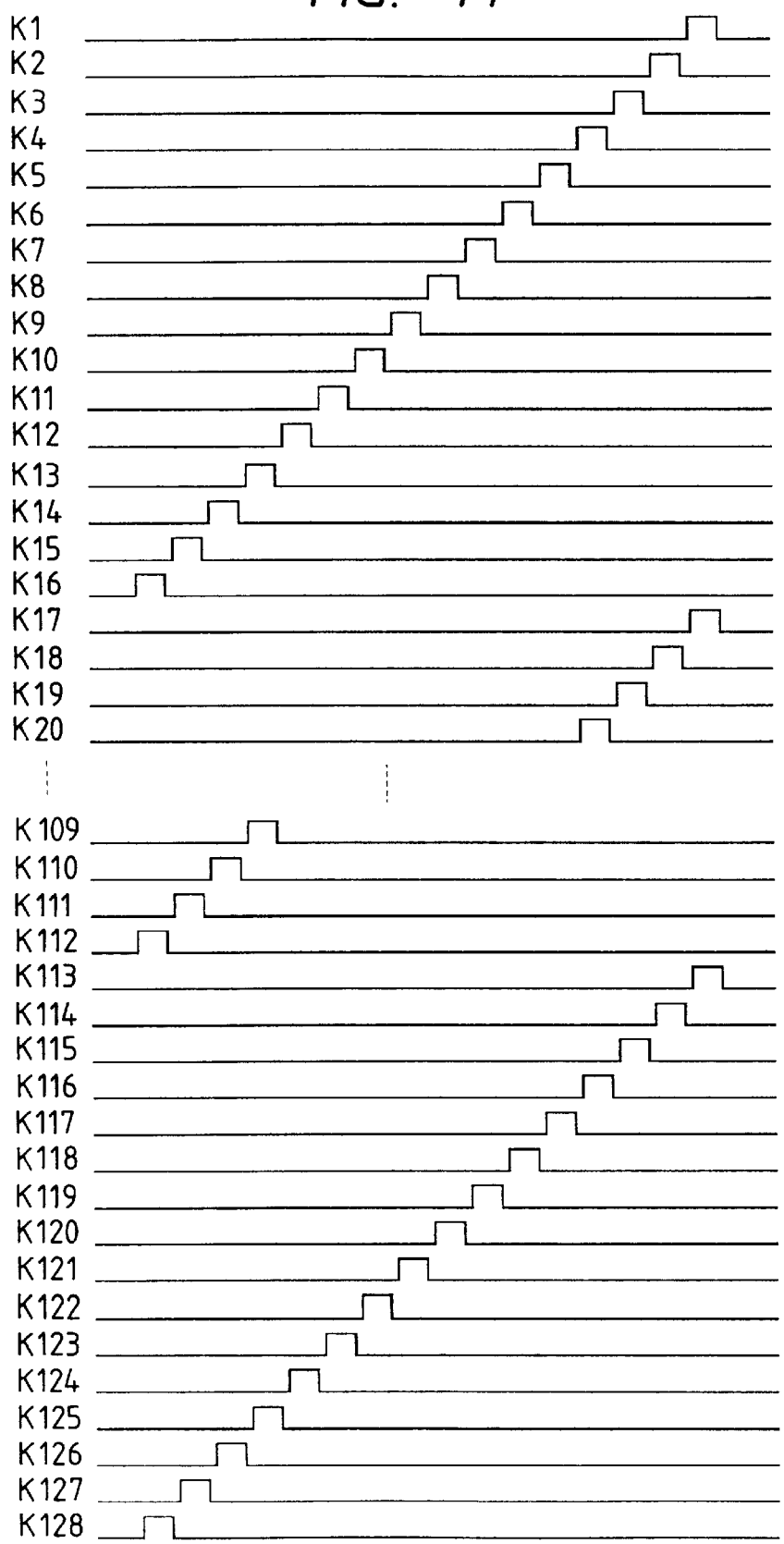
FIG. 11 shows a timing chart of a drive sequence of the print head.

FIG. 11 shows a timing chart of a drive sequence of the print head in the present embodiment. In FIG. 11, the print head is driven in time division fashion so that the 128 nozzles are driven 16 nozzles at a time. Adjacent nozzles are driven at different timings and the nozzles driven simultaneously appear at every 16 dots. By the time division drive, a peak current required to drive the print head may be reduced and a load to a power supply may be reduced. Further, by driving the adjacent nozzles at different timings, a vibration of the ink in the head due to the discharge of the ink droplets is reduced and the discharge characteristic of the ink of the head is improved.

However, since the serial printer is driven while the print head is moved relative to the record sheet, the shift in the drive timing appears as the shift of dot position on the record sheet. In the drive method as shown in FIG. 11, the dot string is formed in sawtooth shape by the time difference due to the time division. Accordingly, when the print head is driven in the time division fashion, some measures are required to prevent print shift due to the time difference of the drive timing.

Figure 12A:
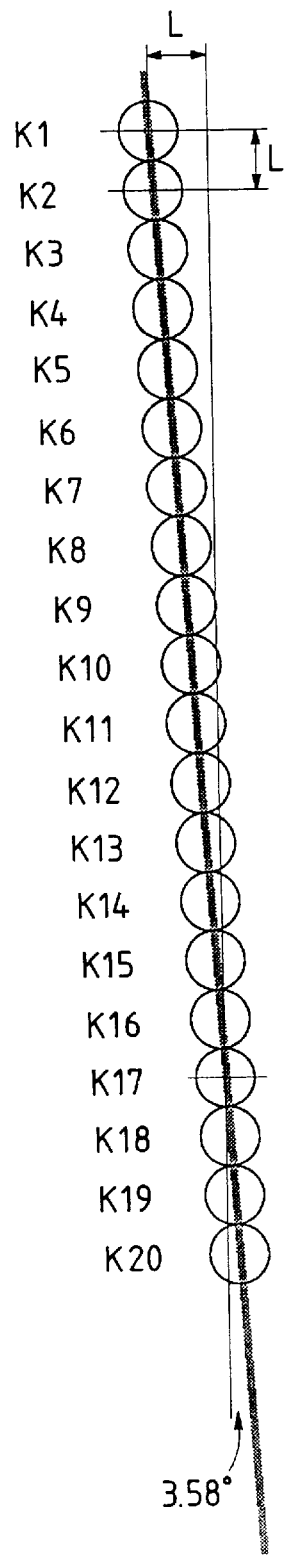
FIGS. 12A and 12B show a relation between an arrangement of nozzles of the print head and an arrangement of print dots.
Figure 12B:
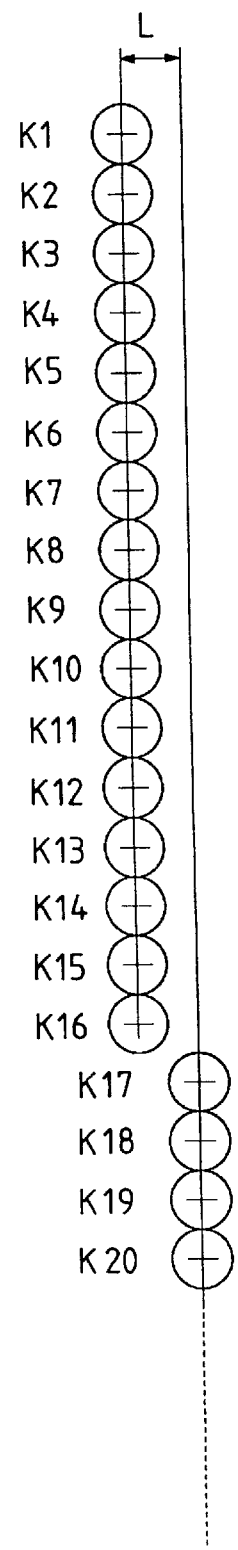

Referring to FIGS. 12A and 12B, a method for preventing print shift due to the time division drive in the present embodiment is explained. FIG. 12A shows a nozzle array of first to twentieth nozzles from the top of the print head. The print head is mounted on the carriage with an inclination of 3.58 degrees relative to a vertical line on the record sheet. Namely, the print head has the inclination of one horizontal dot for every 16 vertical dots. The carriage is scanned horizontally relative to the record sheet.

FIG. 12B shows the dot array formed on the record sheet by the drive sequence of FIG. 11 under this condition. Since the shift of the drive timing due to the time division drive is compensated by the inclination of the head, the dots of the first to sixteenth nozzles are arranged vertically and no print shift occurs. Since the seventeenth dot and the subsequent dots are vertically arranged with one-dot shift to the right, they form dots of the right adjacent column and no print shift occurs. Accordingly, the dots of the adjacent column are formed at every 16 nozzles and 8 columns of stepwise dot strings are formed on the record sheet.

The print buffer control circuit 17 built in the printer control IC is now explained. The print buffer control circuit 17 reads the print data from the print buffer in the RAM 5 and transfers it to the print head. An address array of the print buffer read by the print buffer control circuit 17 is shown in FIG. 13.

Figure 13:
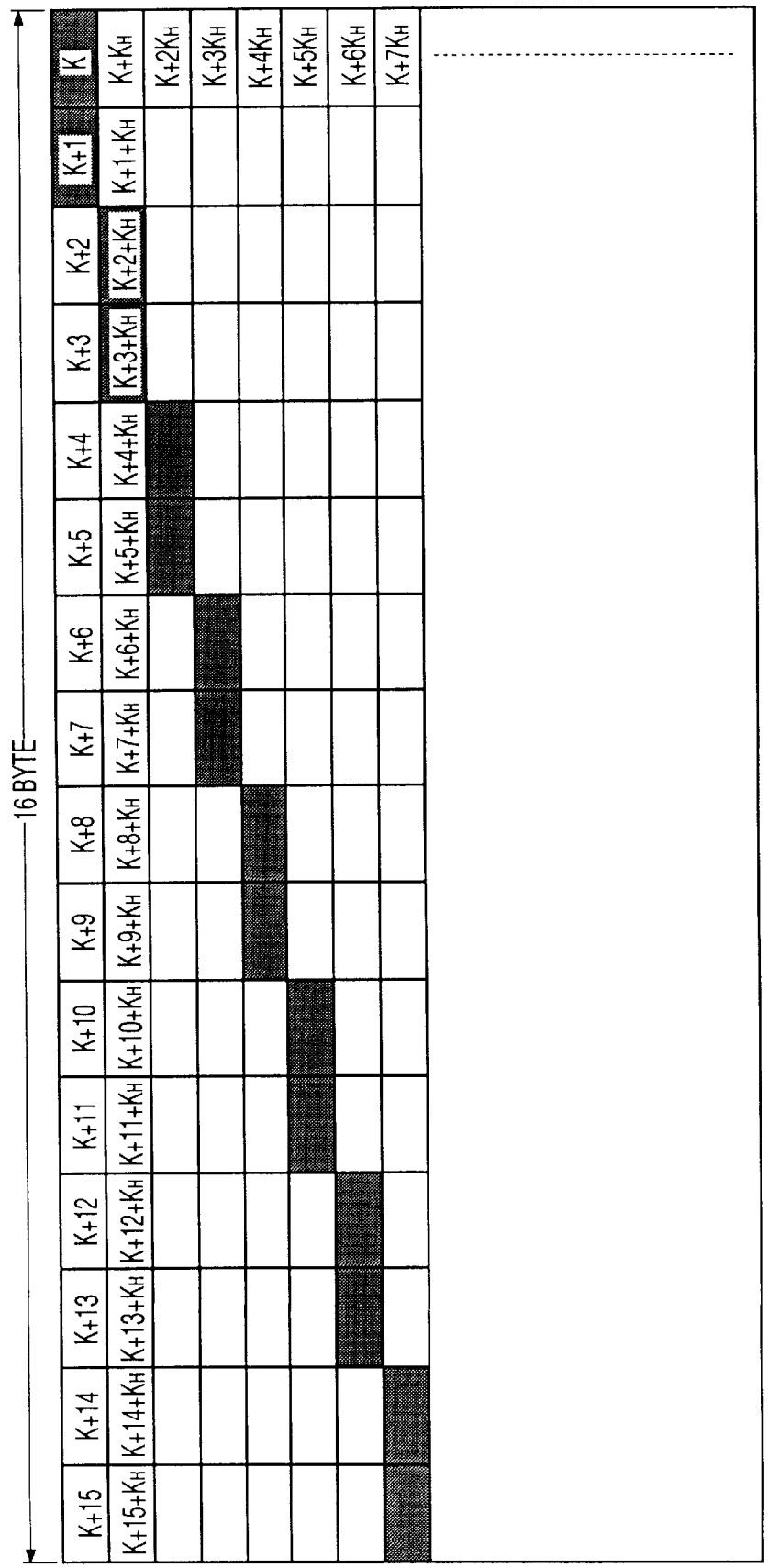
FIG. 13 shows a data structure of the print buffer and a read address.

In FIG. 13, each rectangle having a formula written therein indicates one-byte print data and the formula in the rectangle indicates an address. In FIG. 3, K denotes a start address and KH denotes a horizontal offset. The address of the print buffer is incremented by one vertically and by KH horizontally. In FIG. 13, the address of the print buffer is shown only for the first two columns and the other columns are omitted except the top line. Since the dot string printed by the print head in one drive is stepwise as shown in FIG. 12B, when the data is to be transferred from the print buffer to the print head, the print buffer should also be read stepwise as shown by a meshed area in FIG. 13.

Figure 14:
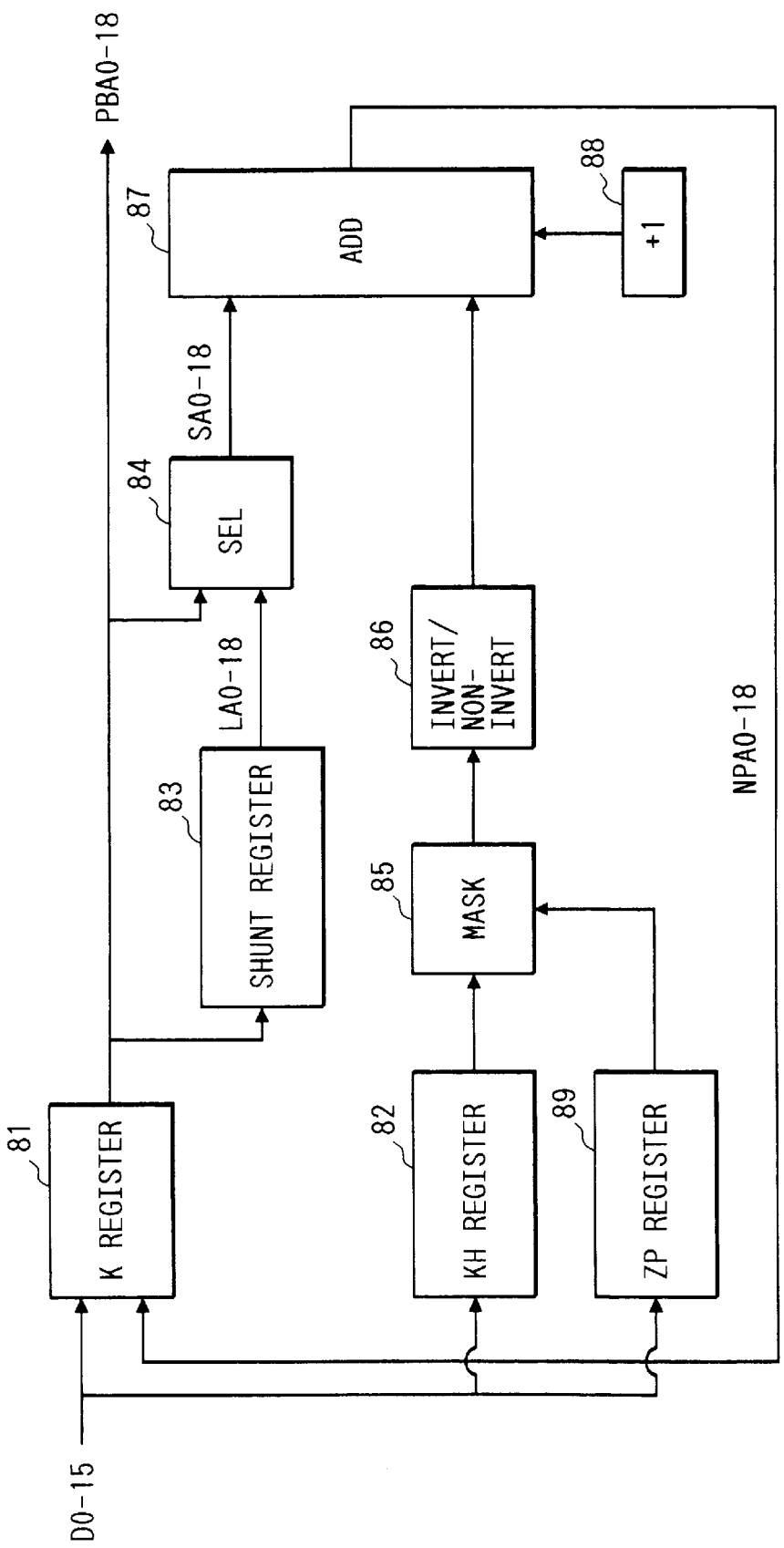
FIG. 14 shows a block diagram of an address generation circuit.

FIG. 14 shows a block diagram of the address generation circuit in the print buffer control circuit. In FIG. 14, numeral 81 denotes an address register, numeral 82 denotes a horizontal offset register, numeral 83 denotes a buffer (or shunt) register, numeral 84 denotes a selector, numeral 85 denotes a mask circuit, numeral 86 denotes an inversion/non-inversion circuit, numeral 87 denotes an adder, numeral 88 denotes a carry control circuit, and numeral 89 denotes a stepwise pattern register. A data signal D0–15 transfers the data written by the CPU 1. The address register 81 and the horizontal offset register 82 are connected to the data signal D0–15, the address register 81 stores the start address and the horizontal offset register 82 stores the horizontal offset. The setting of the start address and the horizontal offset is controlled by the CPU 1.

The output signal PBA0–18 of the address register 81 is supplied to the address signal ADDRESS of the RAM 5 through the output buffer. The buffer register 83 temporarily buffers the output of the address register 81 and supplies it to the signal LA0–18. The selector 84 selects one of PBA0–18 and LA0–18 and outputs it to the signal SA0–18. The mask circuit 85 controls the mask of the output of the horizontal offset register 82. The output of the mask circuit 85 is 0 in the masked state and the output of the horizontal offset register 82 is outputted as it is when unmasked.

The inversion/non-inversion circuit 86 controls the inversion and the non-inversion of the output of the mask circuit 85. The adder 87 adds the output of the selector 84 and the output of the inversion/non-inversion circuit 86 and outputs the sum to the signal NPA0–88. The carry control circuit 88 controls the carry input signal of the adder 87. The signal NPA0–18 is inputted to the address register 81 and used to re-establish the address. The stepwise pattern register 89 is connected to the data signal D0–15 and stores the stepwise pattern of the print head. The stepwise pattern indicates the shape of the dot string formed by one drive of the print head.

FIGS. 15A and 15B show timing charts of an operation of the print buffer control circuit. An operation of the address generation circuit shown in FIG. 14 is explained in conjunction with FIGS. 15A and 15B.

First, the operation for the forward printing, that is, when the carriage is scanned from the left to the right relative to the record sheet is explained. In FIG. 15A, CLK denotes a clock signal for synchronously driving the address generation circuit. Each portion of the address generation circuit changes in synchronism with the rise of CLK. The content of the address register 81 is preset to K and the content of the horizontal offset register is preset to KH. When the print buffer control circuit starts to read the print buffer, the signal PBA0–18 is outputted to the address signal ADDRESS of the RAM 5 and the read pulse is outputted to the read signal READ-. As a result, the print data is read from the start address K and it is transferred to the print head. At the first read, the start address K is buffered in the buffer register 83 and the signal LA0–18 is changed to K.

Since the selector 84 selects the signal PBA0–18, the signal SA0–18 is equal to PBA0–18. The mask circuit 85 is in the mask state and the output is 0. Since the inversion/non-inversion circuit 86 is in the non-inversion state, the output of the mask circuit 85 is outputted as it is. Since the carry control circuit 88 has set the carry, it has the same effect as adding one to the adder 87.

In FIG. 15, the signal with the add value is the sum of the output of the inversion/non-inversion circuit 86 and the output of the carry control circuit 88. The sum of the signal SA0–18 and the above sum is outputted to the signal NPA0–18. Since the add value is +1, NPA0–18 is K+1 and it is fed back to the address register 81. As a result, the content of the address register 81 is set to K+1 at the next clock and the print data is read from the address K+1 and transferred to the print head.

By the setting of the stepwise pattern register 89, the mask circuit 85 is set to the non-mask state and the output is KH. Since the carry control circuit 88 has set the carry, the sum is +1+KH and NPA0–18 is K+2+KH. Since it is fed back to the address register 81, the print data is read from the address K+2+KH at the next clock and transferred to the print head. Similarly, the content of the address register 11 is sequentially incremented and the addresses of the print buffer are read stepwise from K to K+15+7KH. Total of 16 bytes of print data are transferred to the print head.

At the last clock, the selector 84 selects the signal LA0–18 so that the signal SA0–18 is K which has been saved in the buffer register 83. The mask circuit 85 is in the non-mask state and outputs the content KH of the horizontal offset register 82, and the carry control circuit 88 resets the carry so that the sum is KH. Thus, the signal NPA0–18 is K+KH. It is set to the address register 81 at the last clock.

As shown in FIG. 13, the address K+KH indicates the print data which is right adjacent to the address K and the content of the address register 81 is automatically set to the right adjacent address after the print data for one drive of print head has been transferred. As a result, the CPU 1 need not re-establish the address during the scan of the carriage except the setting of the start address before the scan of the carriage.

An operation in the reverse printing is now explained. In FIG. 15B, in the reverse printing, like in the forward printing, the addresses of the print buffer are read stepwise from K to K+15+7KH and the 16-byte print data is transferred to the print head. At the last clock, the inversion/non-inversion circuit 86 is in the inversion state and the carry control circuit 88 sets the carry so that the sum is –KH. As a result, after the transfer of the print data, the content of the address register 81 is set to K–KH which indicates the address which is left adjacent to the address K.

Since the print buffer control circuit automatically reads the data in the print buffer, the CPU 1 need not be involved in the reading of the print buffer during the scan of the carriage except to set the start address before the scan, and the load to the CPU 1 is reduced. Since the reading of the print buffer is conducted while the CPU 1 reads the ROM 2, the print buffer may be read without lowering the throughput of the CPU 1.

The horizontal address change of the print buffer is set to the horizontal offset register. For example, in the print buffer shown in FIG. 8, 40 is set to the horizontal offset register. Thus, the vertical continuous address amount, that is, the size of the print buffer may be set to any value.

The fine mode is now explained. The dot pitch in the normal mode is 1/360 inch for both horizontal and vertical while the horizontal dot pitch in the fine mode is set to 1/720 inch.

Figure 16:
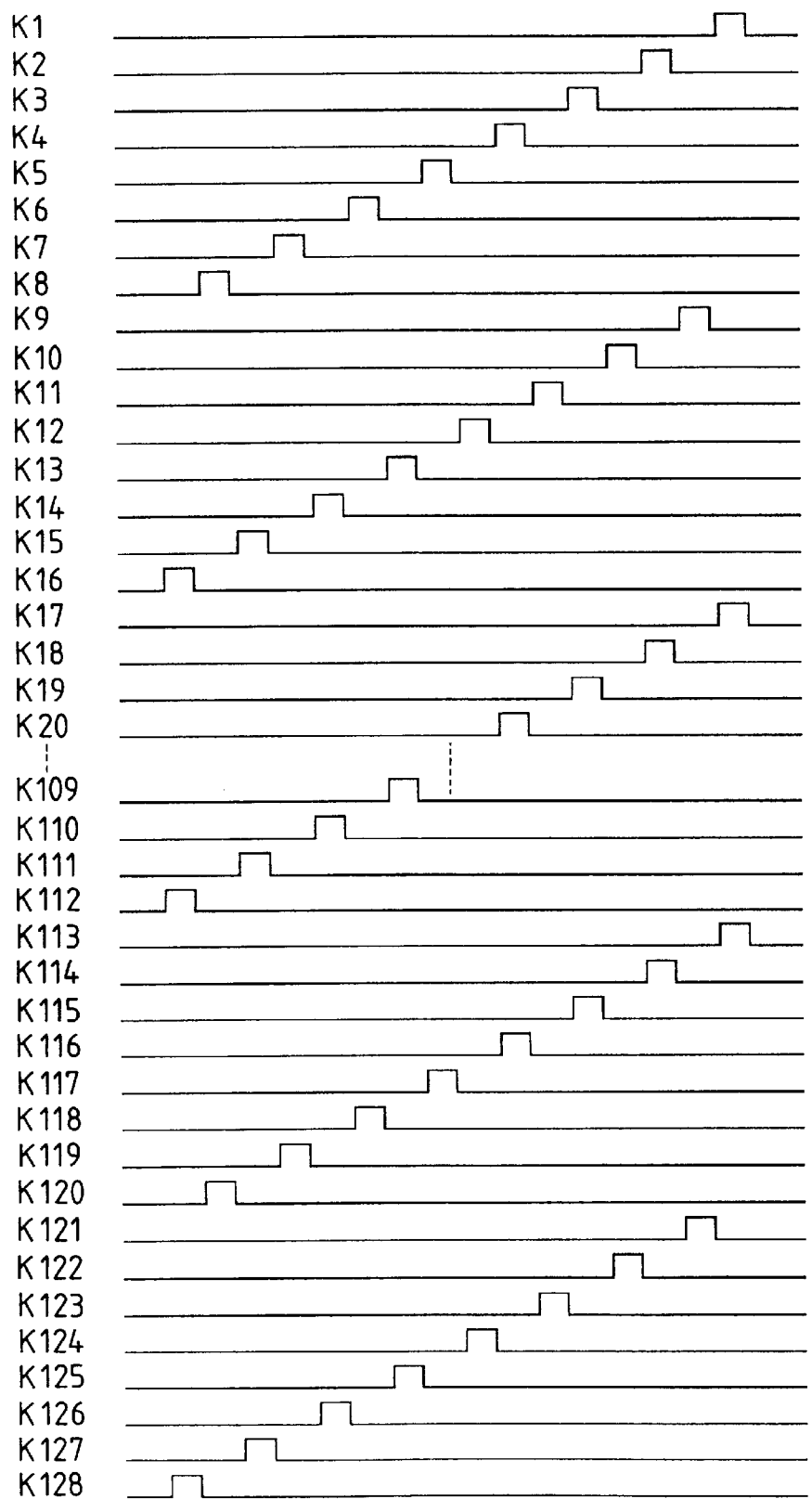
FIG. 16 shows a timing chart of a drive sequence of the print head in a fine mode.

FIG. 16 shows a timing chart of a drive sequence of the print head in the fine mode. The 128 nozzles are divisionally driven in 16 runs. In the second run, the nozzles spaced by 8 dots from the nozzles in the first run are driven.

Figure 17A:
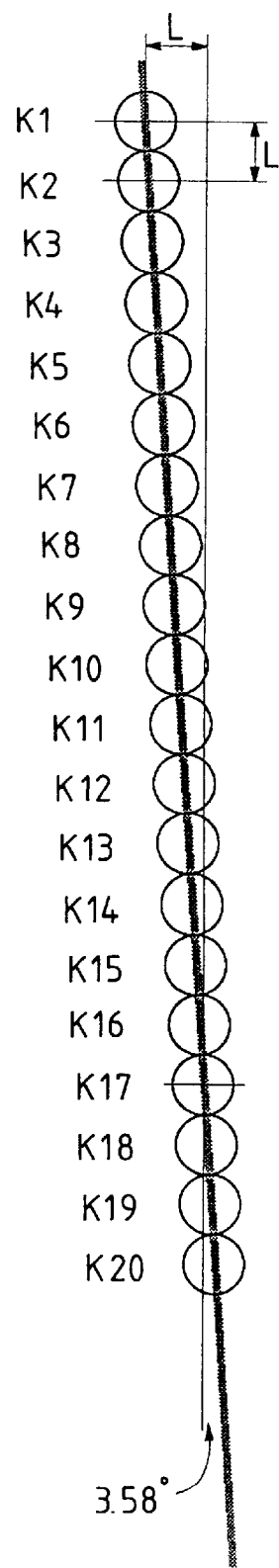
FIGS. 17A and 17B show a relation between an arrangement of the nozzles of the print head and an arrangement of the print dots in the finer mode.
Figure 17B:
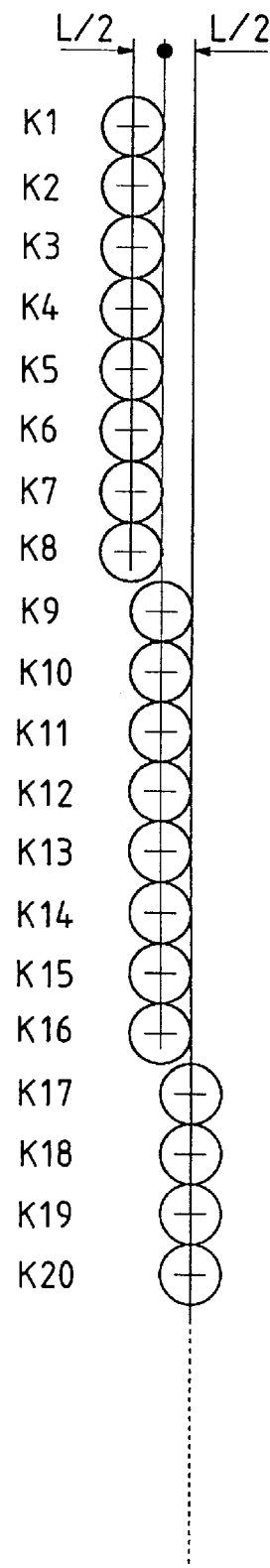

A relation between the nozzle array of the print head and the dot array formed on the record sheet is shown in FIGS. 17A and 17B. FIG. 17A shows the nozzle array of the first to twentieth nozzles from the top of the print head and the print head is mounted on the carriage with the inclination of 3.58 degrees relative to the vertical line on the record sheet. Namely, the print head is inclined at one horizontal dot for every 16 vertical dots. The carriage is scanned horizontally relative to the record sheet. FIG. 17B shows the dot array formed on the record sheet by the drive sequence of FIG. 16 under this condition. Since the shift of the drive timing due to the time division drive is compensated by the inclination of the head, the dots of the first to eighth nozzles are arranged vertically and no print shift occurs. Since the dots of the ninth nozzle and the subsequent nozzles are arranged vertically with 1/720 inch shift to the right, they form the dots of the right adjacent column and no print shift occurs. As shown in FIG. 16, since the nozzles spaced by 8 dots are not driven simultaneously, a slight shift occurs but it does not raise a practical problem.

The dots at the 17th nozzle and the subsequent nozzles are arranged vertically with the space of 1/360 inch to the right. Accordingly, when the entire print head is viewed, 16 dot columns are formed stepwise in one drive.

Figure 18:
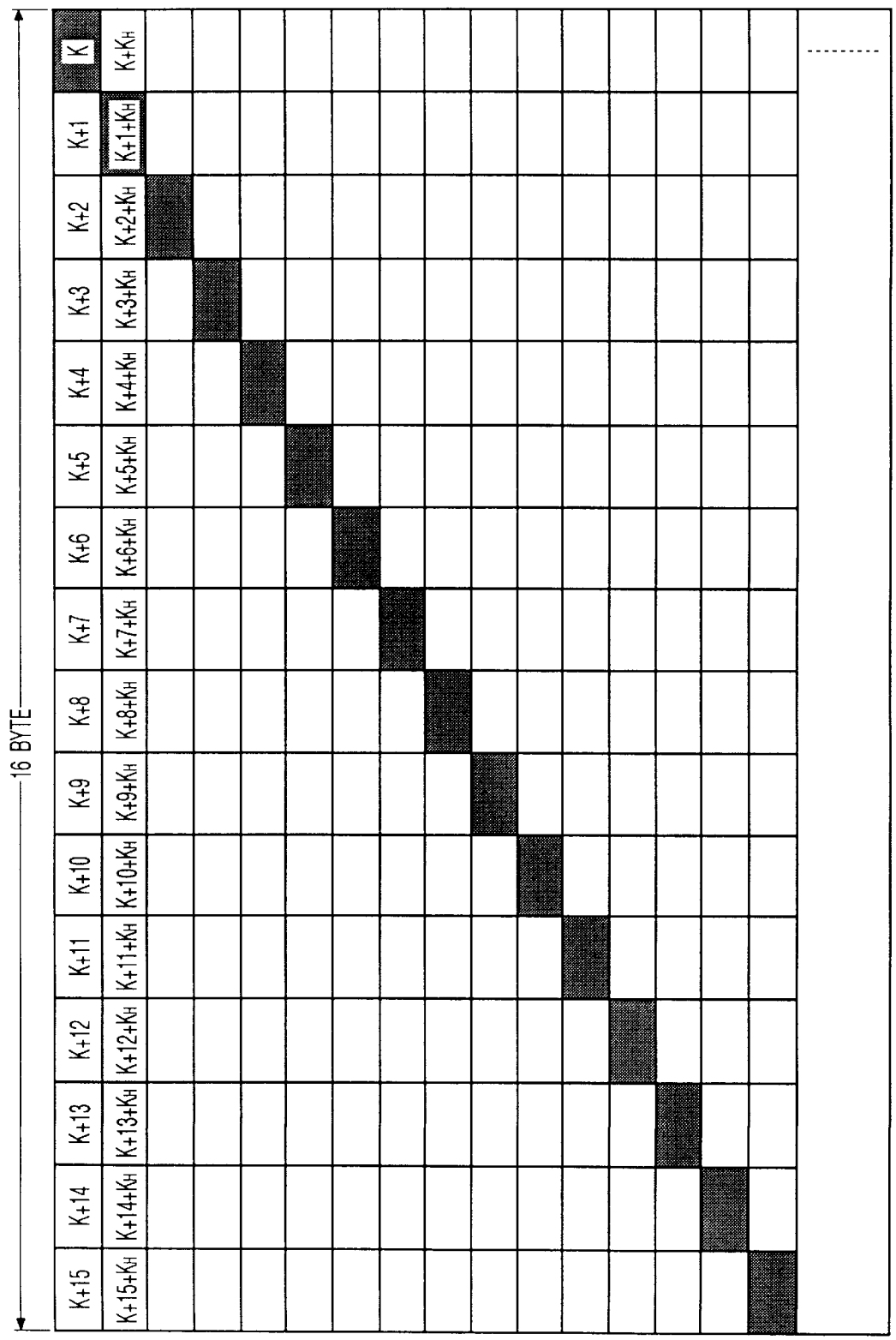
FIG. 18 shows a data structure of the print buffer and a read address in the fine mode.

FIG. 18 shows an address array of the print buffer read by the print buffer control circuit in the fine mode. In FIG. 18, each rectangle having a formula written therein indicates one-byte print data and the formula in the rectangle indicates the address. In FIG. 18, K denotes a start address and KH denotes a horizontal offset. The address of the print buffer is incremented by one vertically and by KH horizontally. In FIG. 18, the address of the print buffer is shown only for the first two columns and the subsequent addresses are omitted.

Since the dot string printed by the print head in one drive is stepwise as shown in FIGS. 17A and 17B, when the data is transferred from the print buffer to the print head, it is necessary that the print buffer is also read stepwise as shown by a meshed area in FIG. 18.

For the reading of the print buffer in the fine mode, the print buffer control circuit shown in FIG. 14 may be used. Namely, by setting the mask circuit 85 to the non-mask state by setting the stepwise pattern register 89 so that the output is KH, the address of the print buffer is read downwardly and rightwardly as shown by the meshed area in FIG. 18.

Figure 19:
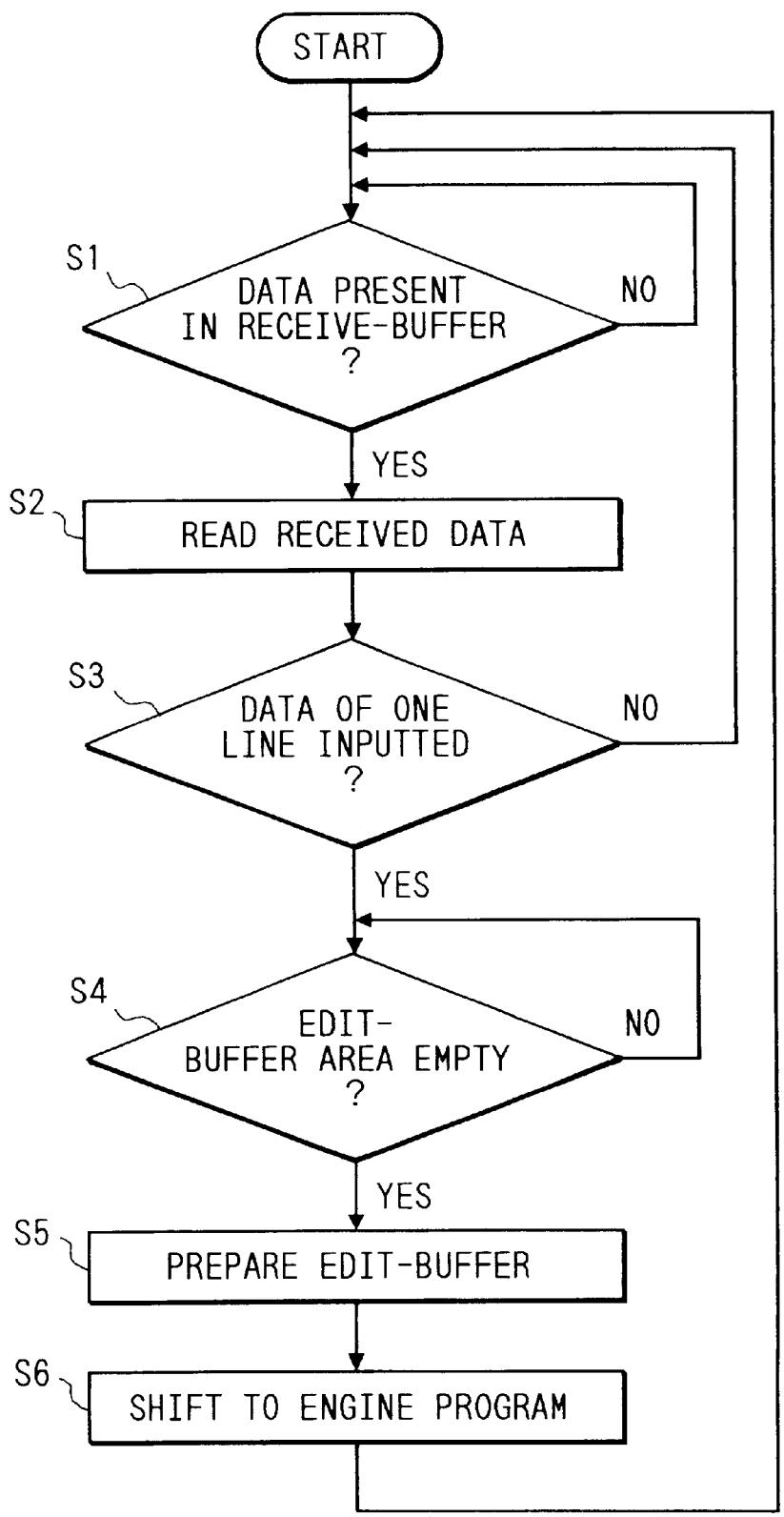
FIG. 19 shows a flow chart of a controller program.

FIG. 19 shows a flow chart of the control program. In a step S1, whether the received data is in the receive buffer or not is checked, and if it is, it is read in a step S2. In a step S3, whether one line of data has been inputted or not is determined, and if it has not been inputted, the process returns to the step S1. If it has been inputted, whether a vacant edit buffer is present or not is determined in a step S4, and if it is, the edit buffer is prepared in a step S5, and it is delivered to the engine program in a step S6.

Figure 20:
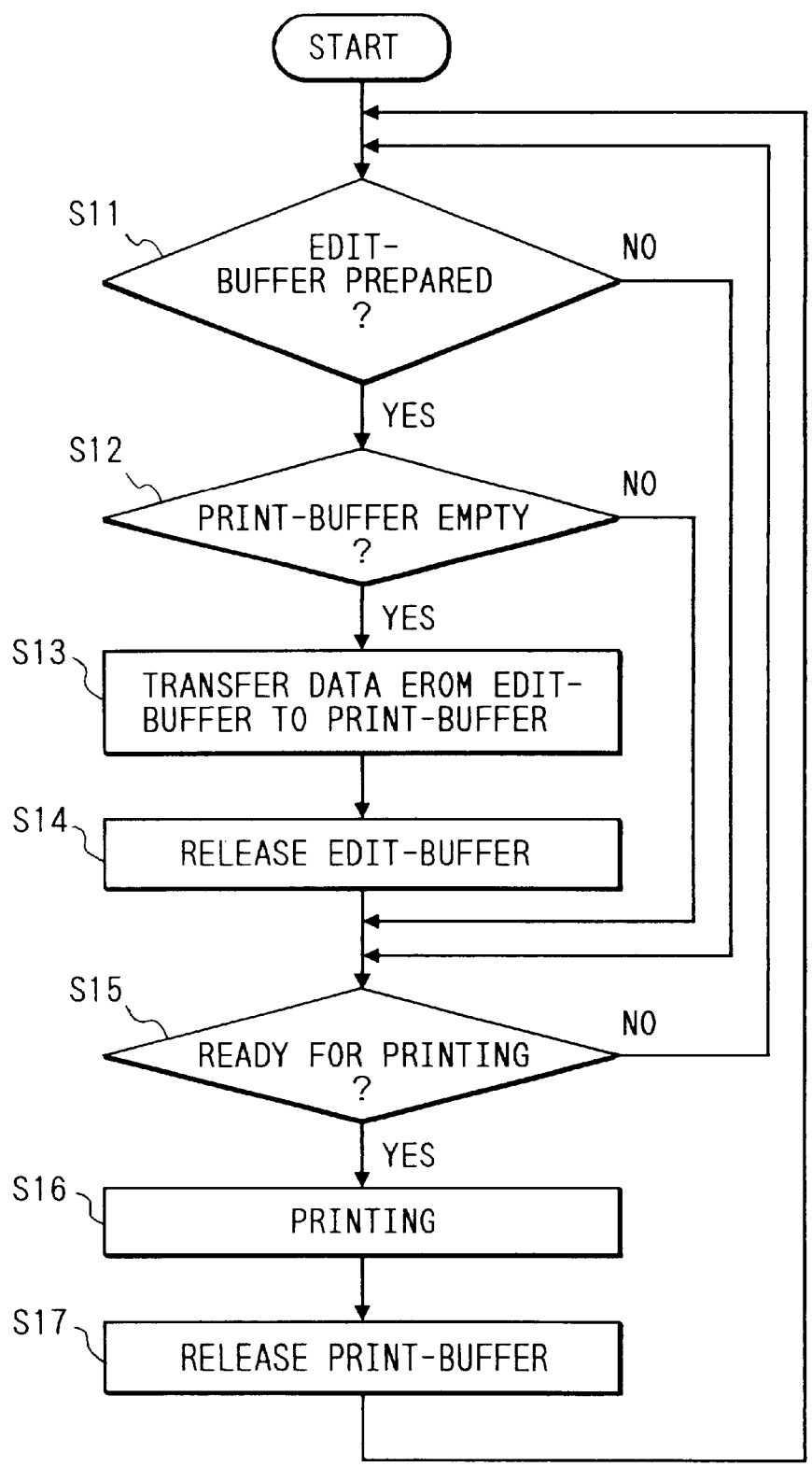
FIG. 20 shows a flow chart of an operation of an engine program.

FIG. 20 shows a flow chart of the engine program. In a step S11, whether the edit buffer is ready not is determined, and if it is ready, the process proceeds to a step S15. If it is not ready, the process proceeds to a step S12. In the step S12, whether there is an enough vacant space for the transfer of the edit buffer (for example, 16 longitudinal bytes) is present in the print buffer or not is determined, and if there is no such space, the process proceeds to a step S15. If there is a space, the data of the edit buffer is transferred to the print buffer in a step S13 and the edit buffer having the data transferred out is released in a step S14. In a step S15, whether the print data of 128-bit height has been accumulated in the print buffer or not and whether there is a bilaterally printable blank raster or not are determined. If not, the process returns to the step S11. If it is, the printing is made in a step S16 and the print buffer area for which the printing has been made is released in a step S17. The released print buffer area is helically coupled to the bottom of the vacant area of the print buffer as described above.

The present embodiment attains the bit shift function by the means for setting the shift amount, the means for inputting the data, the means for shifting the input data by the amount set by the shift amount setting means, the means for saving the shifted out data, the means for merging the input data with the previously saved data, the means for reading the data from the memory, the means for modifying the read data by the merged data and the means for writing the modified data into the memory.

Further, the buffer function is attained by storing the print data and by the memory having the continuous addresses to the longitudinal array of the print data in the buffer.

Further, the head drive function is attained by the means for driving the print head in the time division fashion.

Further, the print buffer control function is attained by the means for setting the start address, the means for setting the address offsets, the means for incrementing the start address and adding it to the address offset to generate the transfer address, the means for determining whether to add the address offset or not in the generation of the transfer address, the means for determining the number of times of transfer, the means for adding or subtracting the address offset to or from the start address, the means for reading the data from the transfer address and the means for outputting the read data.

In accordance with the present embodiment, when the print head having a large number of dots to allow the printing of two or more lines at a time is used, the data is shifted by the bit shift function when the data is transferred from the edit buffer to the print buffer so that any amount of carriage return pitch may be set and the overlap of the edit buffer is attained.

By making the addresses of the print buffer longitudinally continuous, the data transfer from the edit buffer to the print buffer or from the print buffer to the print head is facilitated and the print buffer configuration may be set independently from the number of dots of the head and the management of the print buffer is facilitated. Further, any position in the print buffer may be set as the print area and the freedom in setting the print position is enhanced.

Further, by distributedly driving the print head in the time division fashion, the drive characteristic of the print head is improved and by inclining the head, the print shift due to the time division drive is prevented.

Since the print buffer control circuit automatically reads the data in the print buffer and transfers it to the print head, the CPU 1 need not be involved in the reading of the print buffer during the scan of the carriage, and the load of the CPU 1 is reduced. Since the print buffer control circuit reads the print buffer stepwise in accordance with the dot array shape, the CPU 1 need not consider the dot array shape in preparing the print buffer, and the increase of the load of the CPU 1 is prevented.

[Embodiment 2]

A second embodiment of the present invention is now explained.

Figure 21:
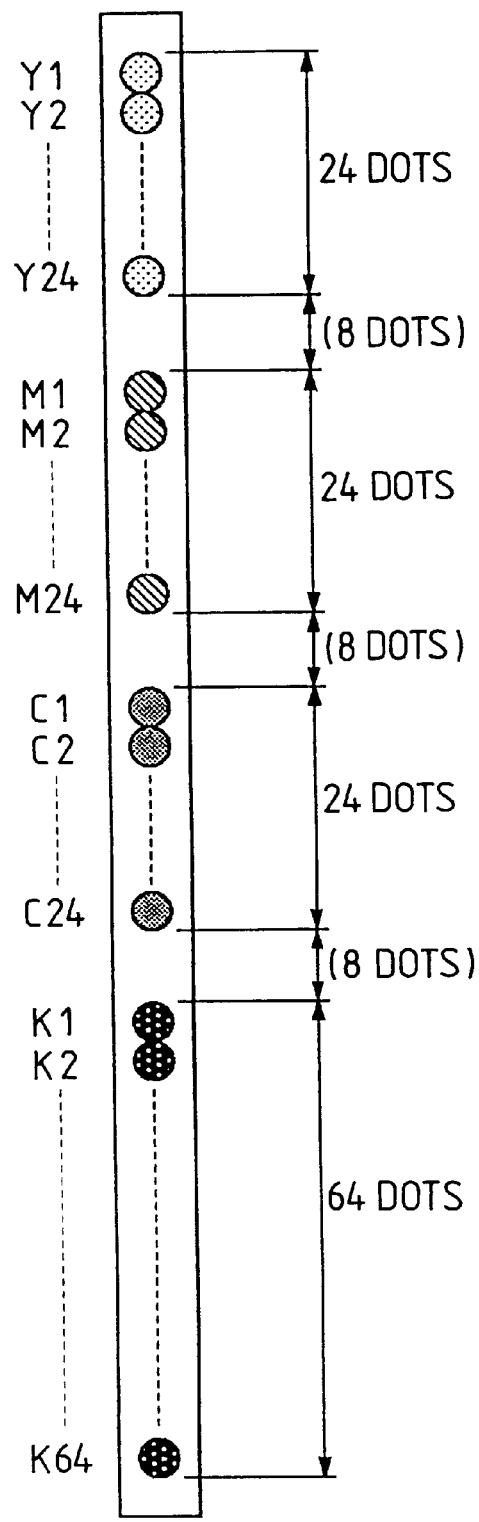
FIG. 21 shows a structure of a color head.

Major parts of the printer control circuit in the present invention are identical to that of FIG. 1 and comprise the CPU 1, the ROM 2, the interface 3, the printer control IC 4, the RAM 5, and the print head 6. FIG. 21 shows a dot structure of the print head in the present embodiment. The print head has 136 nozzles arranged in column, which are, from the top to the bottom, 24 yellow dots, 24 magenta dots, 24 cyan dots and 64 black dots with an 8-dot gap between different colors.

Figure 22:
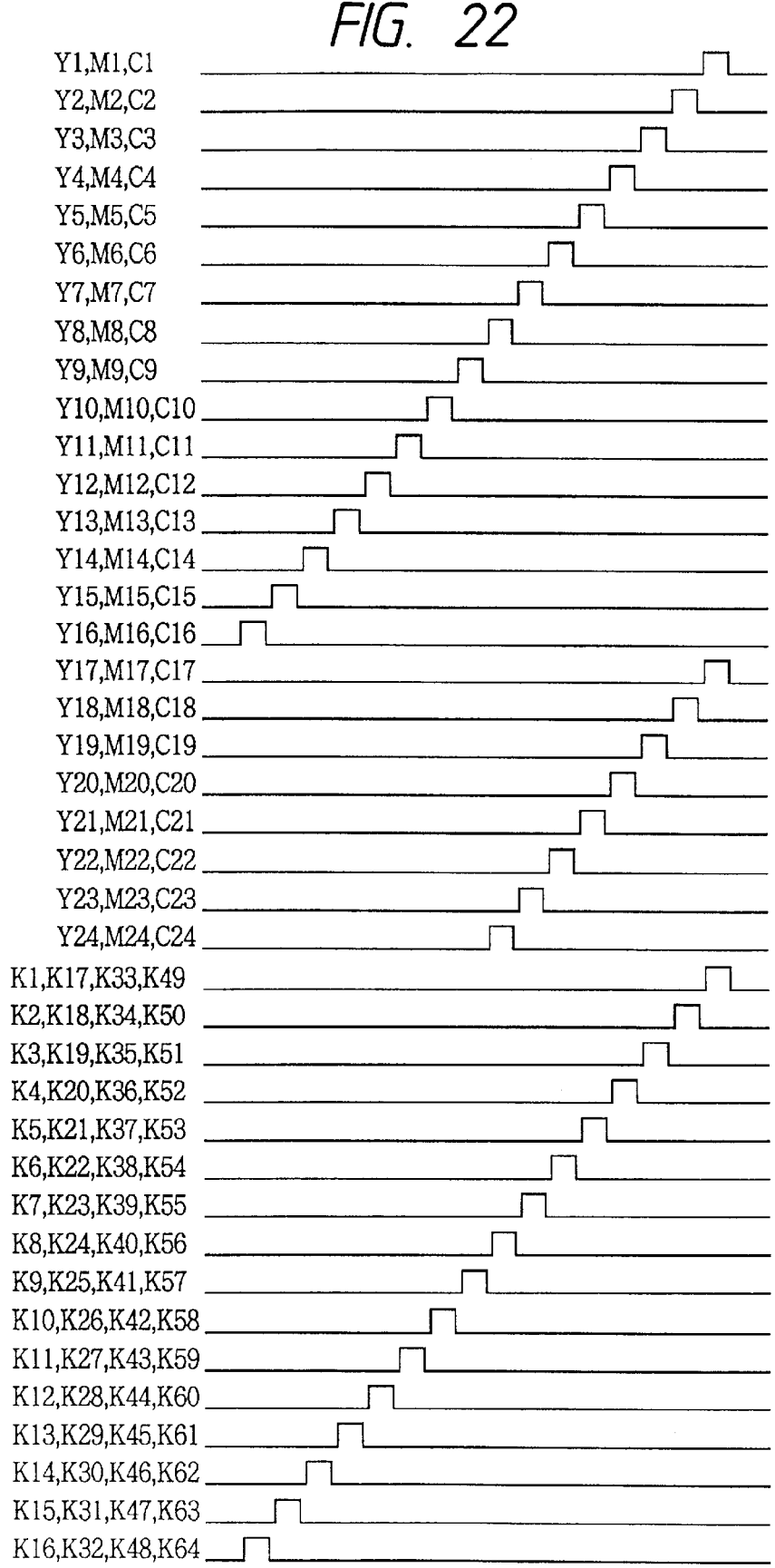
FIG. 22 shows a timing chart of a drive sequence of the color head.

FIG. 22 shows a timing chart of a drive sequence of the print head in the present embodiment. In FIG. 22, the print head is time-division driven so that the 136 nozzles are driven in 16 runs. The adjacent nozzles are driven at different timings and the nozzles simultaneously driven appears at every 16th dot. A peak of the current required to drive the print head is reduced by the time-division drive to reduce a load to the power supply. Further, by driving the adjacent nozzles at different timings, the vibration of the ink in the head due to the discharge of the ink droplets is reduced and the ink discharge characteristic of the head is improved.

In the present embodiment, the method for preventing the print shift by the time-division drive is to compensate the shift by the time division drive by inclining the head as described in conjunction with FIGS. 12A and 12B. When viewed as the entire print head, as shown in FIGS. 23A and 23B, the adjacent columns dots are formed at every 16th nozzle and ten stepwise dot columns are formed on the record sheet by one drive of the print head.

Figure 24:
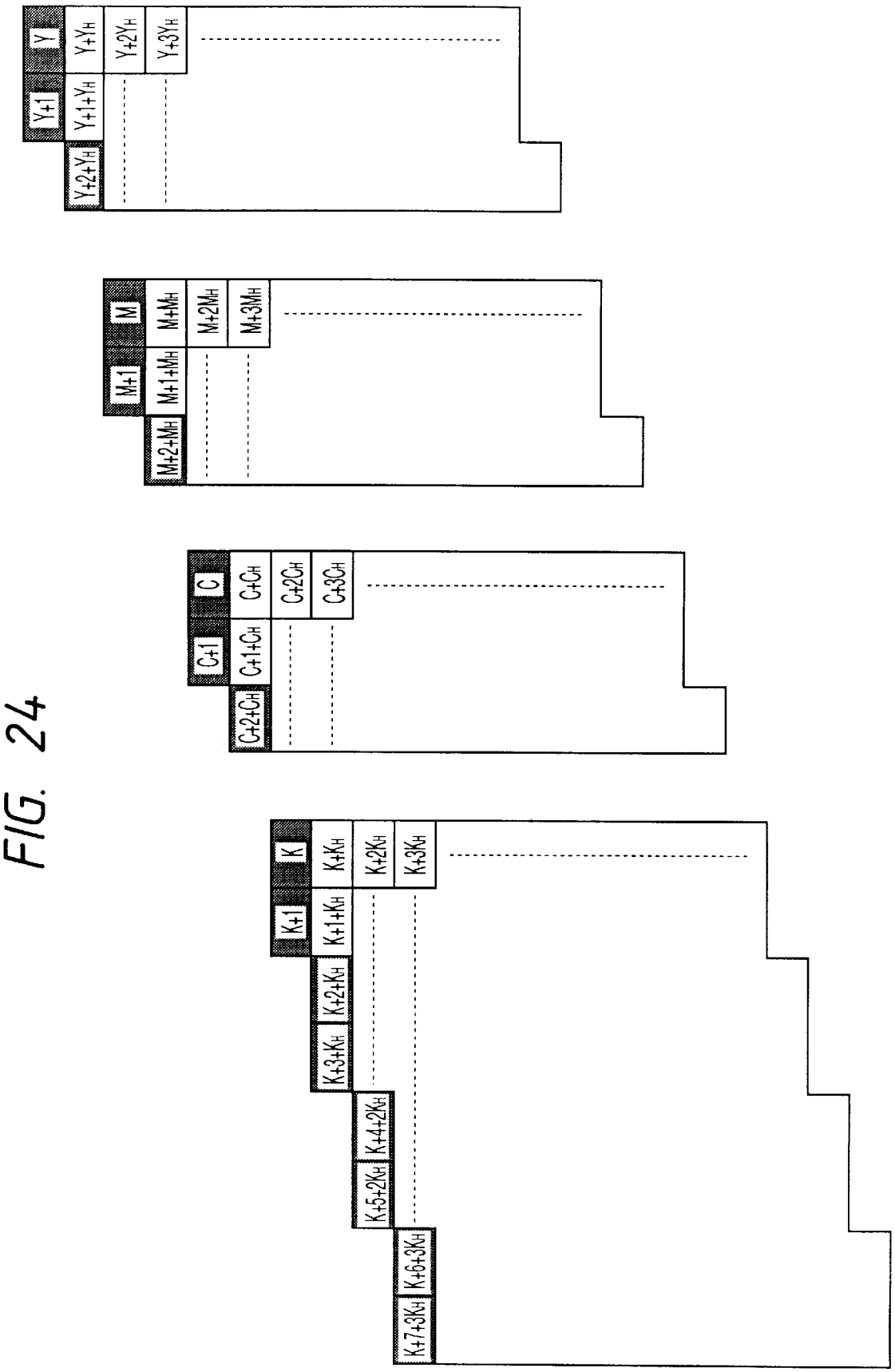
FIG. 24 shows a data structure of the print buffer and a read address.

FIG. 24 shows a data structure of the print buffer in the present embodiment. In FIG. 24, yellow, magenta, cyan, and black colors have independent print buffers. In each print buffer, the print data is arranged longitudinally and the addresses are continuous longitudinally. A start address of the print buffer for each color is Y, M, C, or K and a horizontal offset is YH, MH, CH, or KH. Since the print head prints the stepwise dot column, when data is to be transferred from the print buffer to the print head, the meshed area of FIG. 24, that is, the 3-byte data at the addresses Y, Y+1, and Y+2+YH, the 3-byte data at the addresses M, M+1, and M+2+MH, the 3-byte data at the addresses C, C+1, and C+2+CH and the 8-byte data at the addresses K to K+7+3KH are read. In the present embodiment, longitudinal 8 bytes are allocated to the yellow, magenta, and cyan, longitudinal 20 bytes are allocated to the black and 3000 dots are allocated laterally for the print buffer.

Figure 25:
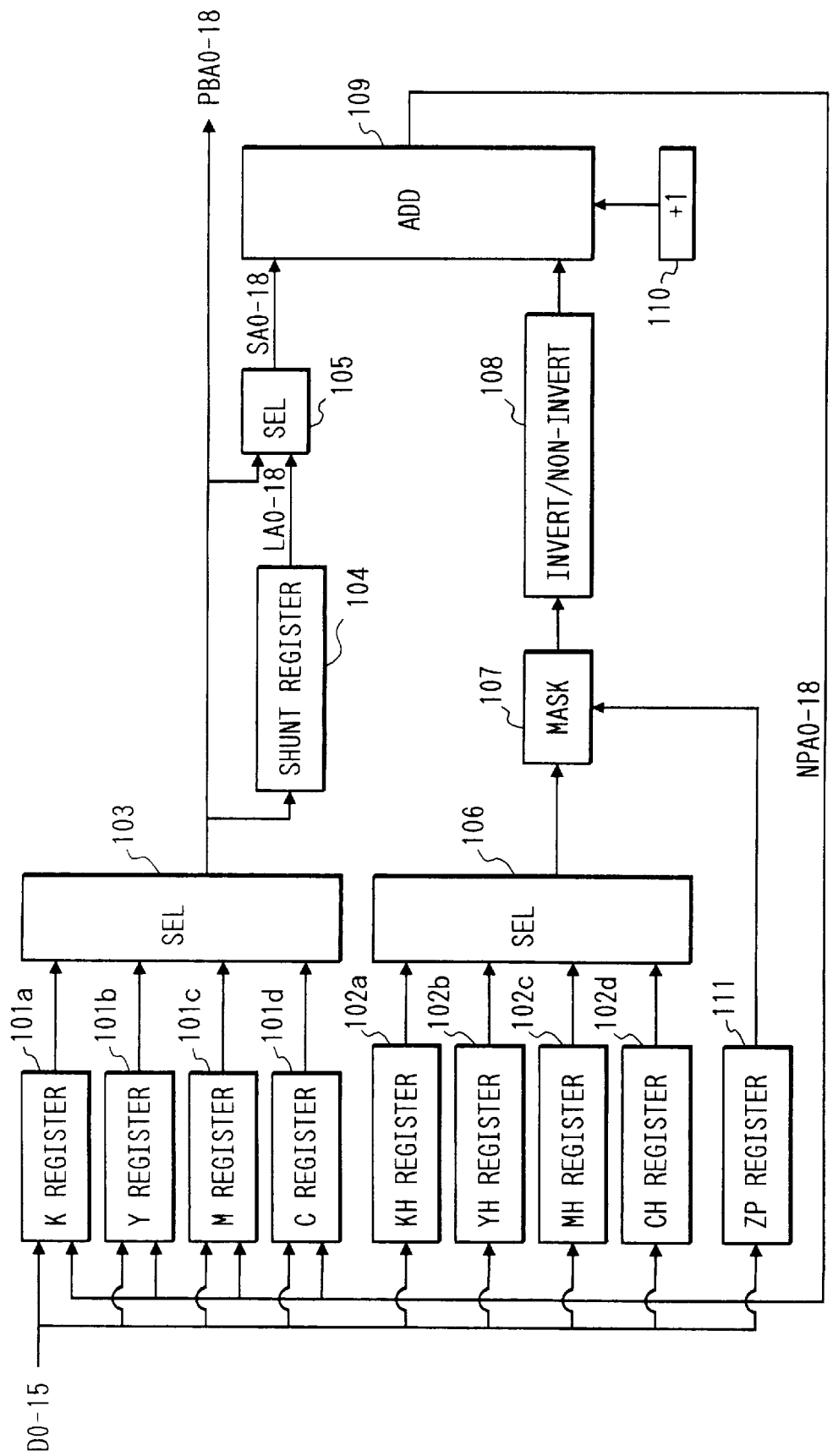
FIG. 25 shows a block diagram of an address generation circuit.

FIG. 25 shows a block diagram of an address generation unit of a printer buffer control circuit built in the printer control IC 4 in the present embodiment. In FIG. 25, numerals 101a to 101d denote address registers, numerals 102a to 102d denote horizontal offset registers, numeral 103 denotes a selector, numeral 104 denotes a buffer (or shunt) register, numerals 105 and 106 denote selectors, numeral 107 denotes a mask circuit, numeral 108 denotes an inversion/non-inversion circuit, numeral 109 denotes an adder, numeral 110 denotes a carry control circuit and numeral 111 denotes a stepwise pattern register. The functions of the address registers 101a to 101d, the horizontal offset registers 102a to 102d, the buffer register 104, the selector 105, the mask circuit 107, the inversion/non-inversion circuit 108, the adder 109, the carry control circuit 110 and the stepwise pattern register 111 are same as those in FIG. 14, and as the print buffer is extended to four colors, the address registers 101a to 101d and the horizontal offset registers 102a to 102d are extended to four sets and the selectors 103 and 106 are provided.

Figure 26:
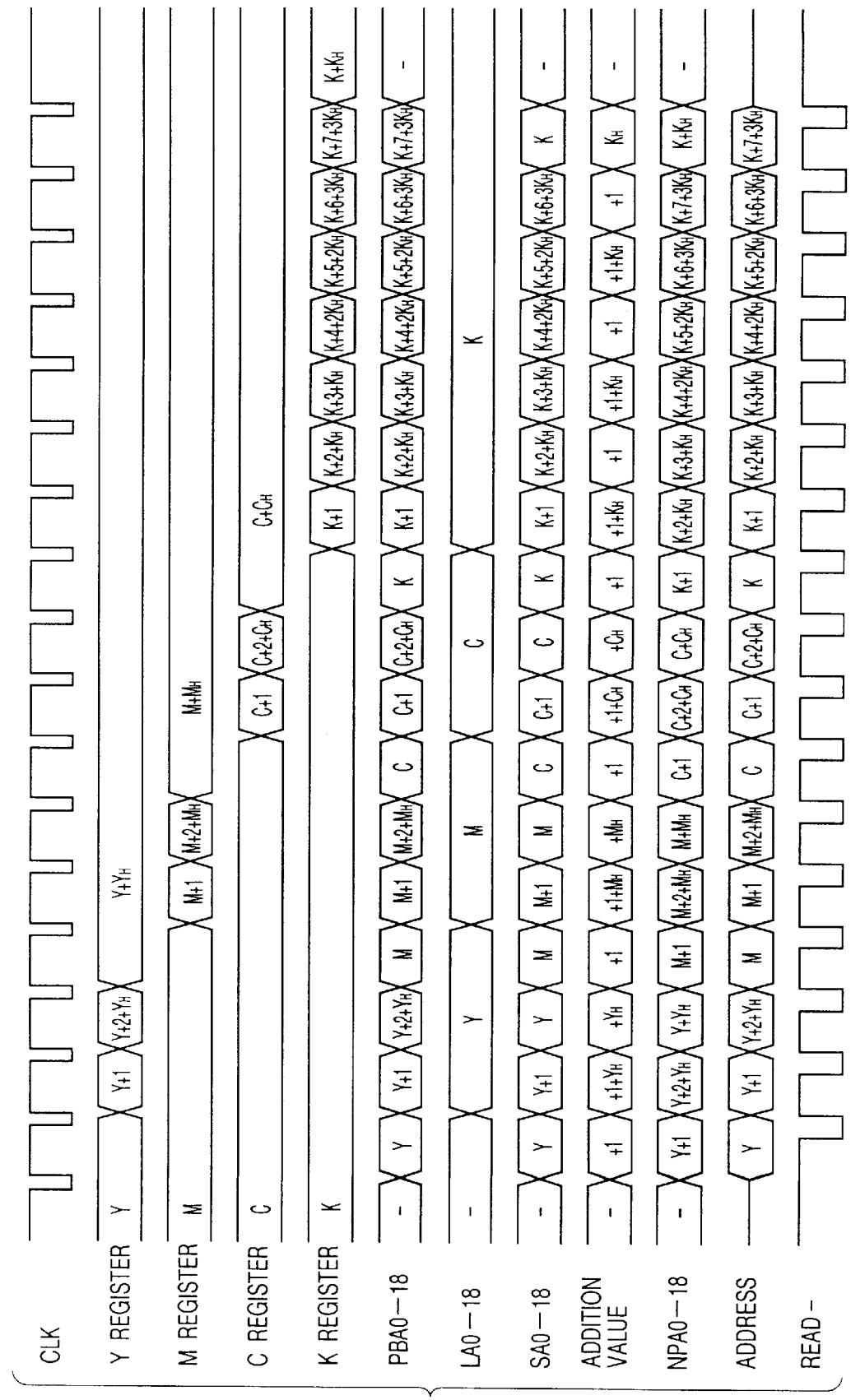
FIG. 26 shows a timing chart of an operation of the address generation circuit.

FIG. 26 shows a timing chart of an operation of the address generation circuit of FIG. 25 for the forward printing. The operation of the address generation circuit shown in FIG. 25 is now explained with reference to FIG. 26.

In FIG. 26, CLK denotes a clock signal for synchronously operating the address generation circuit. Each unit of the address generation circuit changes in synchronism with the rise of CLK. The address registers 101a to 101d are preset to K, Y, M, and C, respectively, and the horizontal offset registers 102a to 102d are preset to KH, YH, MH, and CH, respectively. The stepwise pattern register 111 is set once per 16 dots or two bytes of print data.

When the printer control IC 4 starts to read the print buffer, the content Y of the address register 101b is first selected by the selector 103 and outputted to the signal PBA0–18. The signal PBA0–18 is outputted to the address signal ADDRESS of the RAM 5 and a read pulse is outputted to the read signal READ-. Thus, the print data is read from the start address Y and transferred to the print head 6. At the reading, the start address Y is stored in the buffer register 104 and the signals LA0–18 is set to Y.

Since the selector 105 selects the signal PBA0–18, the signal SA0–18 is equal to the signal PBA0–18. The selector 16 selects the content YH of the horizontal offset register 102b but since the mask circuit is in the masked state, the output is 0. Since the inversion/non-inversion circuit 108 is in the non-inversion state, the output 0 of the mask circuit 107 is outputted as it is. Since the carry generation circuit 110 sets a carry, it has the same effect as that 1 is added to the adder 109.

In FIG. 26, the signal with an add value represents a sum of the output of the inversion/non-inversion circuit 108 and the output of the carry control circuit 110. A sum of the signal SA0–18 and the add value is outputted to the signal NPA0–18. Since the add value is +1, the content of NPA0–18 is Y+1 which is fed back to the address register 101b. As a result, the content of the address register 101b is set to Y+1 at the next clock and the print data is read from the address Y+1 and transferred to the print head 4.

The mask circuit 107 is set to the masked state by the setting of the stepwise pattern register 111 so that it outputs the content YH of the horizontal offset register 102b. Thus, the add value is +1+YH and the content of the address register 101b is set to Y+2+YH at the next clock. Accordingly, for the yellow print buffer, the print data read from the three bytes at the addresses Y, Y+1, and Y+2+YH is transferred to the print head.

When the address Y+2+YH is read, the selector 105 selects the signal LA0–18 so that the signal SA0–18 assumes the content Y saved in the buffer register 104. The mask circuit 15 is set to the non-masked state to output YH and the carry control circuit 110 resets the carry so that the add value is set to YH. As a result, NPA0–18 is Y+YH which is set to the address register 101b. Similarly, the magenta, cyan, and black print data are sequentially read. For the black, the 8-byte print data is transferred to the print head.

Each time the transfer of each color print data is completed, the contents of the address registers 101a to 101d are set to the right adjacent address in each print buffer. Thus, the CPU 1 need not set the address during the scan of the carriage once it sets the start address prior to the scan of the carriage. In the reverse print mode, the contents of the address registers 101a to 101d may be set to the left adjacent address by using the inversion/non-inversion circuit 108.

In the printer of the present embodiment, since the print head having the yellow, magenta, cyan, and black nozzles arranged in line i used, the color printing is attained with an inexpensive construction. Since the print buffer independently controls the addresses of the print buffers of the respective colors, the CPU 1 may separately generate the print buffers of the respective colors in spite of the fact that the data transfer to the print head need be transferred in combination with the print data of the respective colors.

Since the print buffer control circuit has the function of reading the print buffer in accordance with the stepwise dot array shape formed by the print head, the CPU 1 may generate the print data in the print buffer without knowing the dot array shape and the load to the CPU 1 is reduced.

In the printer of the present embodiment, the same process as that of the Embodiment 1 may be attained by using only the black print buffer so that a monochrome head may be used. By using a cartridge print head and making either one of the color head and the monochrome head mountable, an optimum control may be attained for a color printer and a monochrome printer. By assigning an identification number to each of the heads and discriminating the type of head at the printer, the control of the printer may be automatically changed depending on the type of printer mounted.

The present invention is particularly suitable for use in an ink jet recording head and recording apparatus wherein thermal energy generated by an electrothermal transducer, a laser beam or the like is used to cause a change of state of the ink to eject or discharge the ink. This is because the high density of the picture elements and the high resolution of the recording are possible.

The typical structure and the operational principles of such devices are preferably the ones disclosed in U.S. Pat. No. 4,723,129 and U.S. Pat. No. 4,740,796. The principle and the structure are applicable to a so-called on-demand type recording system and a continuous type recording system. Particularly, however, it is suitable for the on-demand type because the principle is such that at least one driving signal is applied to an electro-thermal transducer disposed on a liquid (ink) retaining sheet or liquid passage, the driving signal being large enough to provide such a quick temperature rise beyond a departure from nucleation boiling point, by which the thermal energy is provided by the electro-thermal transducer to produce film boiling on the heating portion of the recording head, whereby a bubble can be formed in the liquid (ink) corresponding to each of the driving signals. By the generation, development, and contraction of the bubbles, the liquid (ink) is ejected through a discharge port to produce at least one droplet. The driving pulse signal is preferably in the form of pulse because the development and the contraction of the bubbles can be effected instantaneously, and therefore the liquid (ink) is ejected with fast response. The driving signal is preferably such as those disclosed in U.S. Pat. No. 4,463,359 and U.S. Pat. No. 4,345,262. In addition, the temperature rise rate of the heating surface is preferably such as those disclosed in U.S. Pat. No. 4,313,124.

The structure of the recording head may be those shown in U.S. Pat. No. 4,558,333 and U.S. Pat. No. 4,459,600 in which the heating portion is disposed at a bent portion, as well as the structure of the combination of the ejection outlet, liquid passage and the electro-thermal transducer disclosed in the above-mentioned patents. In addition, the present invention is applicable to the structure disclosed in Japanese Laid-Open Patent Application No. 59-123670 in which a common slit is used as the discharge port for a plurality of electro-thermal transducers, and the structure disclosed in Japanese Laid-Open Patent Application No. 59-138461 in which an opening for absorbing a pressure wave of thermal energy is formed corresponding to the discharge port.

In addition, the present invention is applicable to a serial type recording head in which the recording head is fixed on a main assembly, to a replaceable chip type recording head which is connected electrically with the apparatus and can be supplied with the ink when it is mounted in the main assembly, or to a cartridge type recording head having an integral ink container.

The provision of the recovery means and/or the auxiliary means for the preliminary operation are preferable because they further stabilize the effects of the present invention. As for such means, there are capping means for the recording head, cleaning means therefor, pressing or sucking means, preliminary heating means which may be an electro-thermal transducer, an additional heating element or a combination thereof. Also, means for effecting preliminary discharge (not for the recording) may stabilize the recording operation.

As regards the recording mode of the recording apparatus, the present invention is effectively applicable to an apparatus having at least one of a monochromatic mode mainly with black, a multi-color mode with different color inks and/or full color mode using the mixture of colors, which may be an integrally formed recording unit or a combination of a plurality of recording heads.

Furthermore, in the foregoing embodiment, the ink is liquid. Alternatively, ink which is solidified below a room temperature and liquefied at a room temperature may be used. Since the ink is controlled within a temperature range of not lower than 30° C. and not higher than 70° C. to stabilize the viscosity of the ink to provide the stable discharge in a conventional recording apparatus of this type, the ink may be such that it is liquid within the temperature range when the recording signal is applied. In addition, the temperature rise due to the thermal energy is positively prevented by consuming it for the state change of the ink from the solid state to the liquid state. Other ink is solidified when it is left, to prevent the evaporation of the ink. In any case, the application of the recording signal producing thermal energy, the ink is liquefied, and the liquefied ink may be discharged. Other ink may start to be solidified at the time when it reaches the recording sheet.

The present invention is also applicable to the ink which is liquefied by the application of the thermal energy. Such ink may be retained in liquid state or solid state in holes or recesses formed in a porous sheet as disclosed in Japanese Laid-Open Patent Application No. 54-56847 and Japanese Laid-Open Patent Application No. 60-71260. The sheet is faced to the electro-thermal transducers. The most effective one of the inks described above is the film boiling system.

The ink jet recording apparatus may be used as an output terminal of an information processing apparatus such as a computer or the like, as a copying apparatus combined with an image reader or the like, or as a facsimile machine having information sending and receiving functions.

In accordance with the present invention, since the addresses of the print buffer are always continuous longitudinally, the data transfer from the edit buffer to the print buffer or from the print buffer to the print head is facilitated and the construction of the print buffer may be designed independently from the number of dots of the head so that the management of the print buffer is facilitated.

Further, any position in the print buffer may be set as the print area and the freedom to set the print position is enhanced. Further, when the print head which permits the printing of two or more lines at a time is used, any carriage return pitch may be set and the overlapping of the edit buffers is permitted by the bit shift function by shifting the data when the data is transferred from the edit buffer to the print buffer.

While the invention has been described with reference to the structures disclosed herein, it is not confined to the details set forth, and this application is intended to cover such modifications or changes as may come within the purposes of the improvements or the scope of the following claims.

What is claimed is:

1. A printer for printing by a print head having a plurality of recording elements arranged thereon, comprising:

scan means for scanning said print head in a scan direction different from a direction of arrangement of said plurality of recording elements;

memory means for storing print data, wherein said memory comprises first address areas for storing the print data in number more than the number of said plurality of recording elements along a different direction from the scan direction and second address areas for storing the print data along the scan direction, the address of the first address areas is continuous relative to the arrangement of the print data corresponding to the different direction, and the address of the second address areas is offset by an amount corresponding to the first address areas, independent of the number of said plurality of recording elements, to the arrangement of the print data corresponding to the scan direction;

write means for writing into said memory the print data in number more than the number of said plurality of recording elements along the different direction; and read means for reading the print data written in said memory from a corresponding address to the arrangement of said plurality of recording elements for supplying the print data to said print head.

2. A printer according to claim 1 wherein said read means comprises means for setting a start address, means for setting an address offset, means for incrementing the start address to generate a transfer address, means for determining a number of times of transfer, means for adding or subtracting, depending on the scan direction, the offset address to or from the start address when the addresses have been generated by the number of times of transfer, and means for reading the print data from said memory in accordance with the transfer address.

3. A printer according to claim 2 wherein said read means further comprises means for setting whether to add the address offset when the transfer address is generated, and said transfer address generation means increments the start address and adds the address offset thereto to generate the transfer address.

4. A printer according to claim 1 wherein said memory has at least two times as many areas as the number of recording elements along the direction of array of said recording elements.

5. A printer according to claim 1 further comprising feed means for feeding a record medium to be recorded by said print head.

6. A printer according to claim 1 wherein said printer is applied to a copying apparatus.

7. A printer according to claim 1 wherein said printer is applied to a facsimile apparatus.

8. A printer according to claim 1 wherein said printer is applied to a computer terminal.

9. A printer according to claim 1 further comprising:

set means for setting a shift amount of the print data;

shift means for shifting the input print data by the amount set by said set means;

save means for saving the print data overflown by the shift of said shift means;

combine means for combining the print data saved in said save means with the next input print data shifted by said shift means;

modify means for modifying the data read from said memory with the combined data combined by said combine means; and write means for writing the data modified by said modify means into said memory.

10. A printer according to claim 1 further comprising drive means for driving said print head in time division fashion.

11. A printer according to claim 3 further comprising drive means for driving said print head in time division fashion.

12. A printer according to claim 11 further comprising a plurality of mode set means for driving said print head in the time division fashion in a plurality of manners and determining whether to add the address offset or not at the generation of the transfer address and means for setting the add mode of the address offset to comply with the time division drive manner of said print head.

13. A printer according to claim 1 wherein said print head discharges ink.

14. A printer for printing by a print head having a plurality of recording elements arranged thereon, comprising:

scan means for scanning said print head in a scan direction different from a direction of arrangement of said plurality of recording elements;

memory means for storing print data in a plurality of areas, wherein said plurality of areas include first and second address areas, the first address areas storing the print data in number more than the number of said plurality of recording elements along a different direction from the scan direction and second address areas for storing the print data along the scan direction, the address of the first address areas is continuous relative to the arrangement of the print data corresponding to the different direction, and the address of the second address areas is offset by an amount corresponding to the first address areas, independent of the number of said plurality of recording elements, to the arrangement of the print data corresponding to the scan direction;

write means for writing into the plurality of areas of said memory the print data in number more than the number of said plurality of recording elements along the different direction; and read means for reading the print data written in the plurality of areas of said memory from a corresponding address to the arrangement of said plurality of recording elements for supplying the print data to said print head.

15. A printer according to claim 14 wherein said read means includes means for setting a plurality of start addresses, means for setting a plurality of address offsets, means for selecting one of the start addresses, means for selecting the address offset corresponding to the selected start address, means for determining the order of selection of the start address and the address offset, means for incrementing the selected start address to generate a transfer address, means for determining a number of times of transfer, means for adding or subtracting, depending on the scan direction, the offset address to or from the start address when the addresses have been generated by the number of times of transfer and read means for reading the print data from said memory in accordance with the transfer address.

16. A printer according to claim 15 wherein said read means further includes means for setting whether to add the address offset when the transfer address is generated, and said transfer address generation means increments the selected start address and adds the selected address offset thereto to generate the transfer address.

17. A printer according to claim 14 wherein the recording elements of said print head are grouped into a plurality of groups for recording different colors.

18. A printer according to claim 17 wherein the area of said memory are associated with the groups of said print head.

19. A printer according to claim 18 wherein each of the areas of said memory has at least two times as many areas as the number of recording elements of the corresponding group along the direction of array of said recording elements.

20. A printer according to claim 14 further comprising feed means for feeding a record medium to be recorded by said print head.

21. A printer according to claim 14 wherein said printer is applied to a copying apparatus.

22. A printer according to claim 14 wherein said printer is applied to a facsimile apparatus.

23. A printer according to claim 14 wherein said printer is applied to a computer terminal.

24. A printer according to claim 14 further comprising:

set means for setting a shift amount of the print data;

shift means for shifting the input print data by the amount set by said set means;

save means for saving the print data overflown by the shift of said shift means;

combine means for combining the print data saved in said save means with the next input print data shifted by said shift means;

modify means for modifying the data read from said memory with the combined data combined by said combine means; and write means for writing the data modified by said modify means into said memory.

25. A printer according to claim 14 further comprising drive means for driving said print head in time division fashion.

26. A printer according to claim 14 further comprising means for mounting a plurality of types of print heads and means for determining the type of the mounted print head wherein the content of the print data to be transferred to said print head is changed in accordance with the type of the mounted print head.

27. A printer according to claim 14 wherein said print head discharges ink.

28. A printing method for printing by a print head having a plurality of recording elements arranged thereon, comprising the steps of:

providing scan means for scanning the print head in a scan direction different from a direction of arrangement of the plurality of recording elements;

providing memory means for storing print data, wherein the memory includes first address areas for storing the print data in number more than the number of the plurality of recording elements along a different direction from the scan direction and second address areas for storing the print data along the scan direction, the address of the first address areas is continuous relative to the arrangement of the print data corresponding to the different direction, and the address of the second address areas is offset by an amount corresponding to the first address areas, independent of the number of the plurality of recording elements, to the arrangement of the print data corresponding to the scan direction;

writing in a vacant area of the memory the print data in number more than the number of said plurality of recording elements along the different direction; and reading the print data written into the memory from a corresponding address to the arrangement of said plurality of recording elements for supplying the print data to the print head.

29. A printing method according to claim 28 wherein the memory has at least as twice many areas as the number of the recording elements in the direction of arrangement of the recording elements.

30. A printing method according to claim 29, further comprising a step of releasing the area of the memory in which the print data read by said read step has been stored and coupling the released area to a vacant area of the memory.

31. A printing method according to claim 28 wherein the print head discharges ink.

32. A printer according to claim 1, wherein said write means writes new print data in an area of said memory where the print data read out by said read means was written.

33. A printer according to claim 32, wherein an address, corresponding to the direction of arrangement, of the new print data written by said write means in said memory is continuous to that of print data already written by said write means.

34. A printer according to claim 14, wherein said write means writes new print data in an area of said memory where the print data read out by said read means was written.

35. A printer according to claim 34, wherein an address, corresponding to the direction of arrangement, of the new print data written by said write means in said memory is continuous to that of print data already written by said write means.

36. A printer according to claim 28, wherein said writing step writes new print data in an area of the memory where the print data read out by said reading step was written.

37. A printer according to claim 36, wherein an address, corresponding to the direction of arrangement, of the new print data written in said writing step in the memory is continuous to that of print data already written in said writing step.

* * * * *

UNITED STATES PATENT AND TRADEMARK OFFICE
CERTIFICATE OF CORRECTION

PATENT NO. : 5,927,871
DATED : July 27, 1999
INVENTOR(S) : Kazuhiro Nakata

It is certified that error appears in the above-identified patent and that said Letters Patent is hereby corrected as shown below:

<u>Title page,</u>
Item [56], References Cited,
After "U.S. PATENT DOCUMENTS" please insert -- 4,567,570   01/1986   Peer   384/900 --.

After "FOREIGN PATENT DOCUMENTS" please insert

--   0 142 098   05/1985   EUROPE 0 315 417   05/1989   EUROPE 0 347 805   12/1989   EUROPE 0 396 982   11/1990   EUROPE 0 517 543   12/1992   EUROPE 0 578 434   01/1994   EUROPE 62-066945   03/1987   JAPAN 2-301452   12/1990   JAPAN 5-016445   01/1993   JAPAN --.

<u>FIG. 20,</u>
Block S13, "EROM" should read -- FROM --.

<u>FIG. 27,</u>
Block 18, "HEAT" should read -- HEAD --.

<u>Column 1,</u>
Line 16, "printer" should read -- printers --.

UNITED STATES PATENT AND TRADEMARK OFFICE
CERTIFICATE OF CORRECTION

PATENT NO. : 5,927,871
DATED : July 27, 1999
INVENTOR(S) : Kazuhiro Nakata

It is certified that error appears in the above-identified patent and that said Letters Patent is hereby corrected as shown below:

Column 5,
Line 11, "64-dot high," should read -- 64 dots high , --;
Line 25, "height" should read -- high --; and
Line 38, "denote" should read -- denotes --.

Column 12,
Line 7, "nozzles" should read -- nozzles, --;
Line 8, "run" should read -- run, --; and
Line 66, "an enough" should read -- enough --.

Column 15,
Line 21, "signals" should read -- signal --.

Column 21,
Line 11, "as twice many" should read -- twice as many --.

Signed and Sealed this

Twenty-seventh Day of November, 2001

*Attest:*

NICHOLAS P. GODICI
*Attesting Officer*     *Acting Director of the United States Patent and Trademark Office*